US012431615B2

(12) United States Patent
Herbsommer et al.

(10) Patent No.: US 12,431,615 B2
(45) Date of Patent: Sep. 30, 2025

(54) MILLIMETER WAVE QUANTUM SENSOR DEVICE

(71) Applicant: TEXAS INSTRUMENTS INCORPORATED, Dallas, TX (US)

(72) Inventors: Juan Herbsommer, Allen, TX (US); Hassan Omar Ali, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 68 days.

(21) Appl. No.: 18/496,654

(22) Filed: Oct. 27, 2023

(65) Prior Publication Data

US 2025/0141098 A1 May 1, 2025

(51) Int. Cl.
*H01Q 1/36* (2006.01)
*H01Q 1/38* (2006.01)
*H01Q 1/48* (2006.01)
*H01Q 13/06* (2006.01)

(52) U.S. Cl.
CPC ............... *H01Q 1/366* (2013.01); *H01Q 1/38* (2013.01); *H01Q 1/48* (2013.01); *H01Q 13/06* (2013.01)

(58) Field of Classification Search
CPC ...... H01Q 1/366; H01Q 1/38–48; H01Q 9/04; H01Q 13/06; H01Q 15/00; H01P 5/00; H01P 5/10
See application file for complete search history.

(56) References Cited

U.S. PATENT DOCUMENTS

| | | | |
|---|---|---|---|
| 9,386,688 B2 * | 7/2016 | MacDonald | H01Q 9/0407 |
| 11,990,686 B2 * | 5/2024 | Woo | H01Q 3/34 |
| 2020/0168974 A1 * | 5/2020 | Vosoogh | H01P 1/2005 |

* cited by examiner

*Primary Examiner* — Hasan Islam

(74) *Attorney, Agent, or Firm* — Xiaotun Qiu; Frank D. Cimino

(57) ABSTRACT

A device comprises a U-shaped cell configured to contain a quantum gas, a first waveguide coupled to an inlet of the U-shaped cell, and a second waveguide coupled to an outlet of the U-shaped cell. The device also comprises a multi-layer substrate including transmitter and receiver antennas that are aligned with the first and second waveguides, respectively, the substrate including a network of metal layers coupled to the transmitter and receiver antennas. The device also includes transmitter and receiver dies coupled to the transmitter and receiver antennas, respectively, by way of the network of metal layers, the substrate positioned between the U-shaped cell and the transmitter and receiver dies.

23 Claims, 44 Drawing Sheets

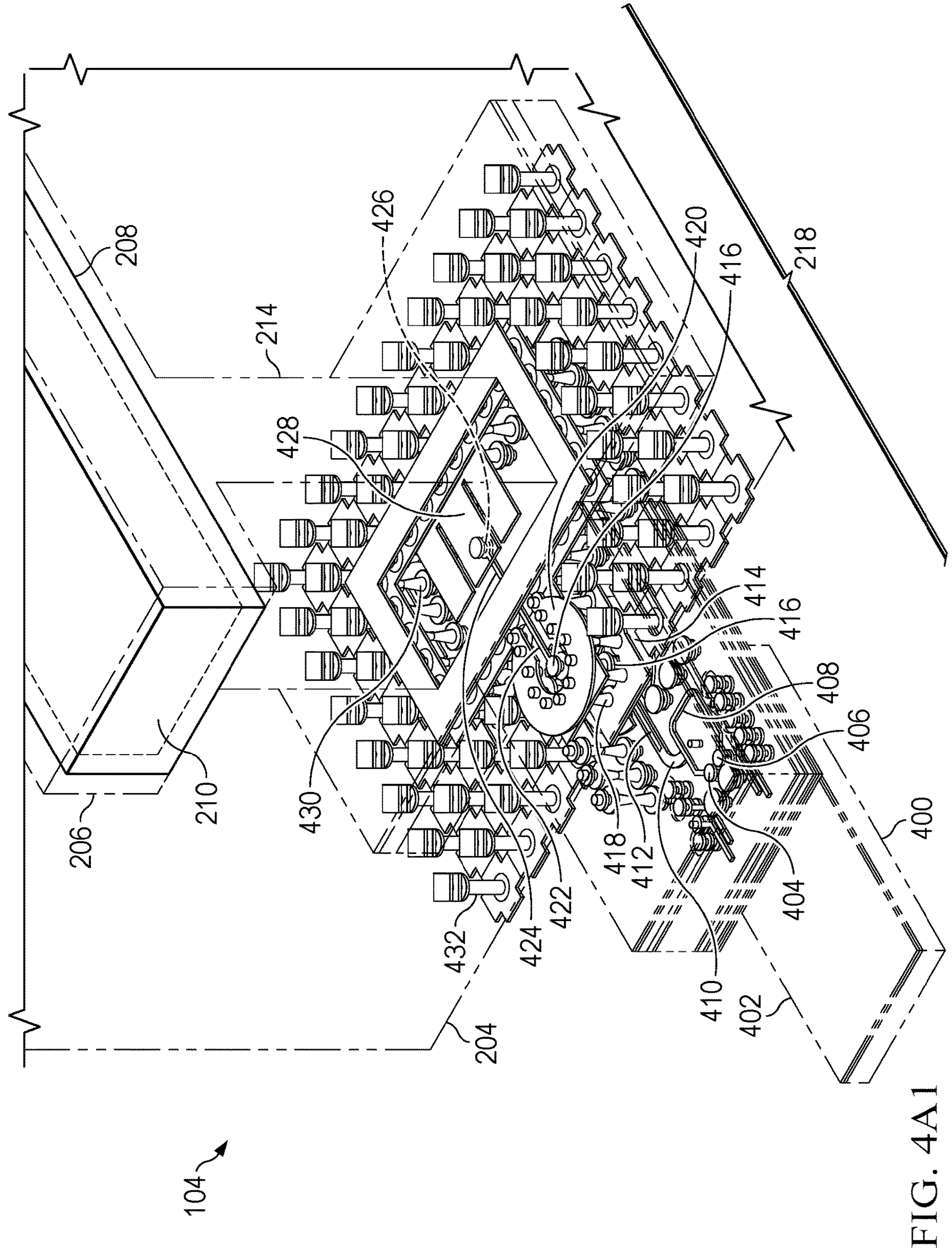
FIG. 4A1

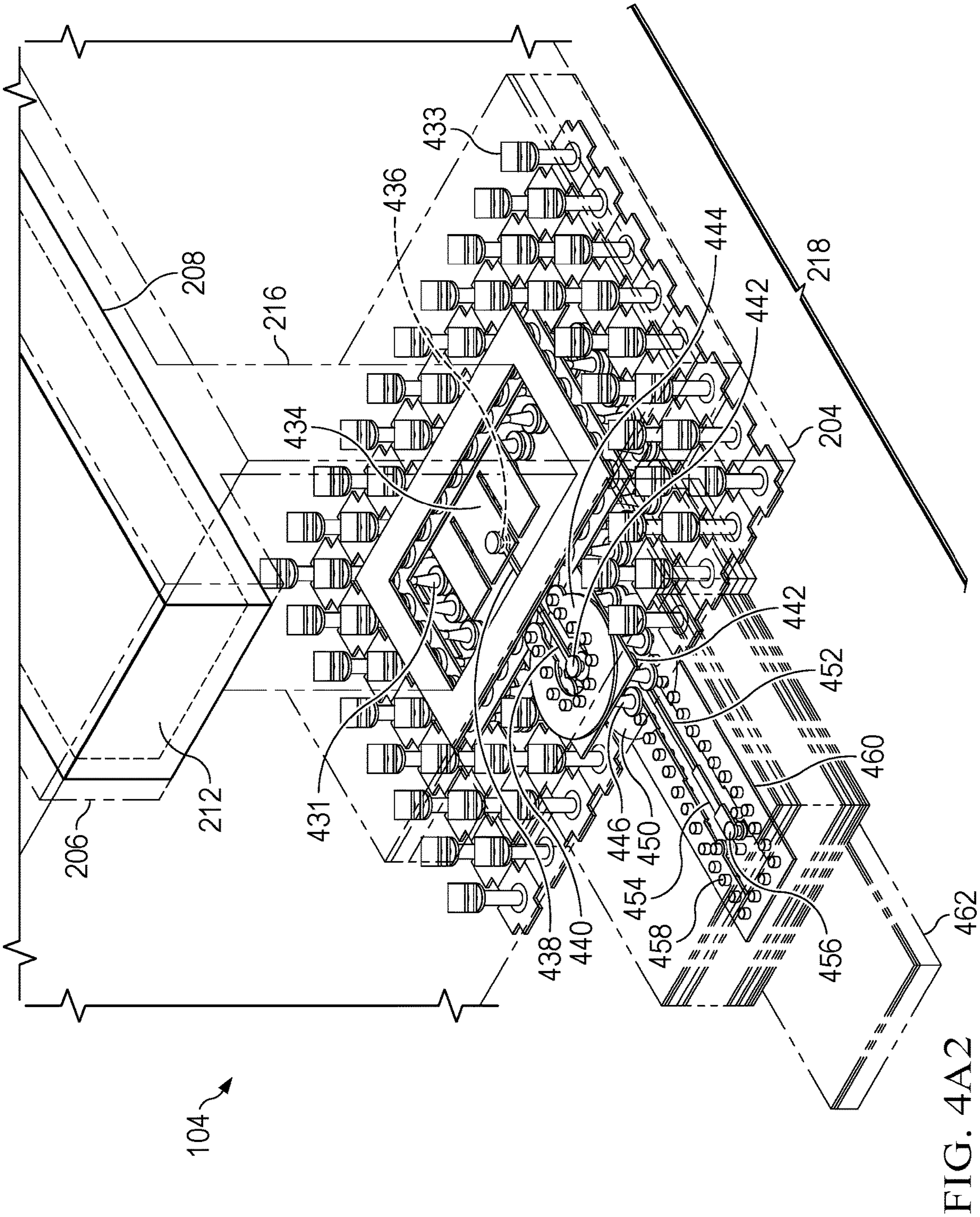
FIG. 4A2

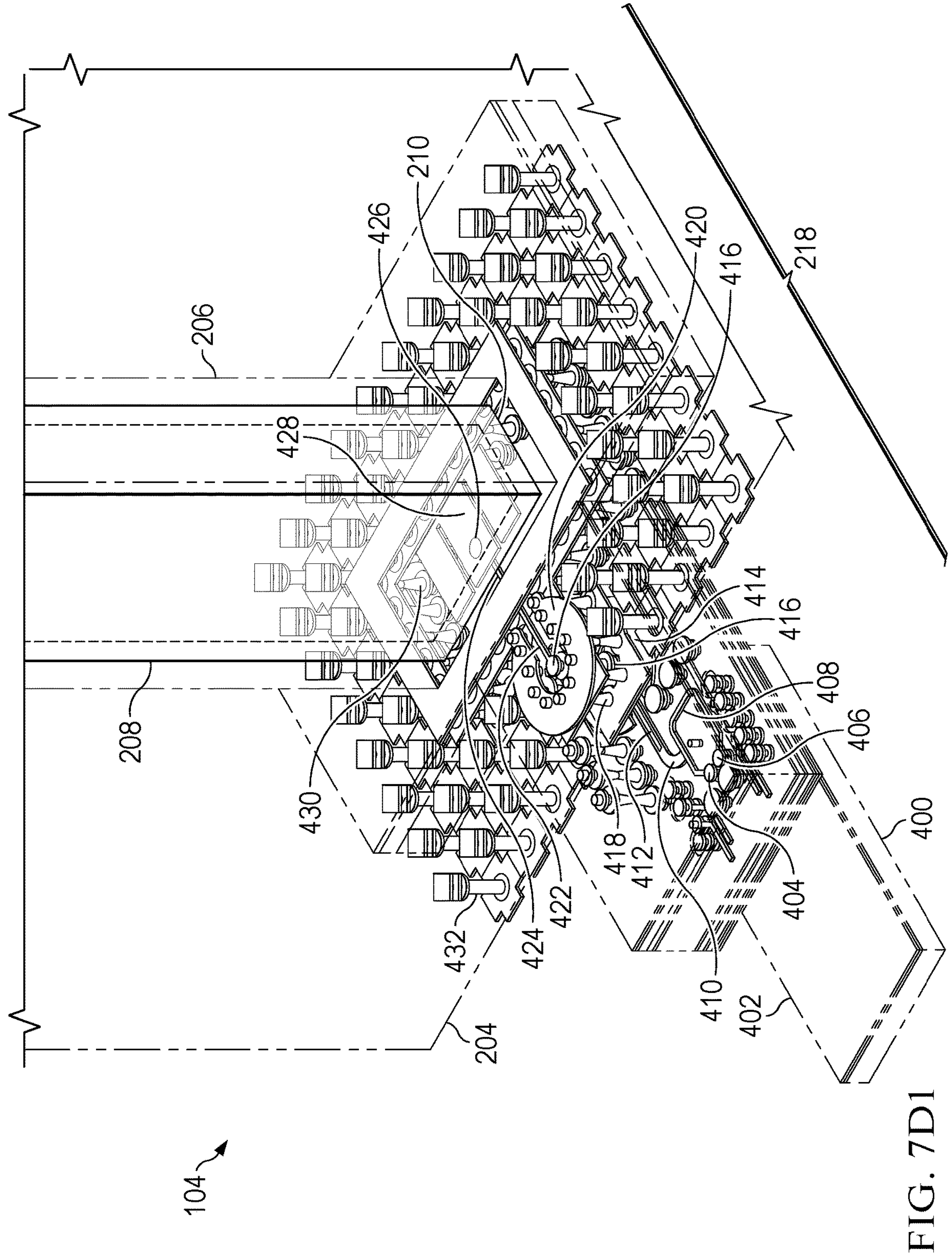
FIG. 7D1

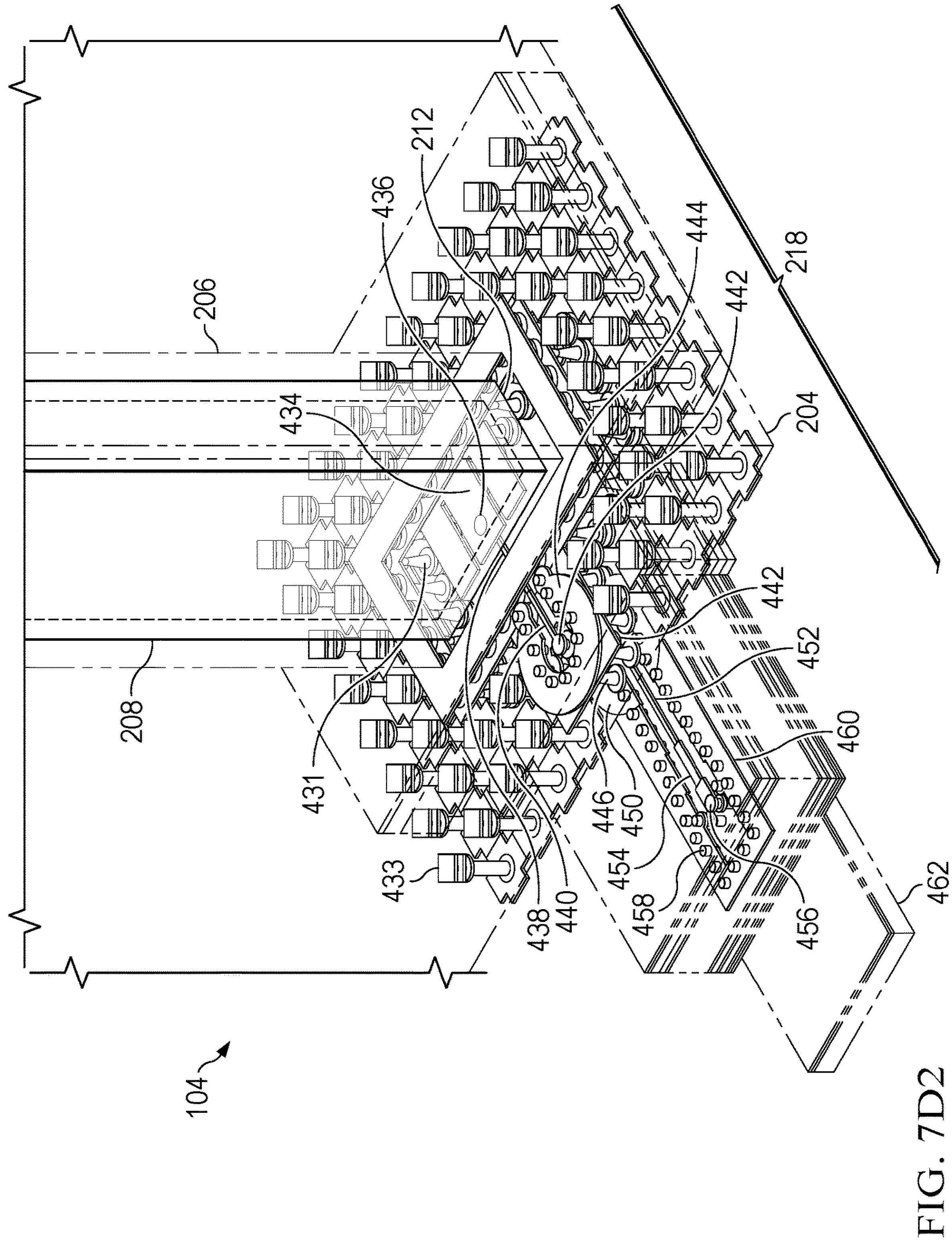
FIG. 7D2

MILLIMETER WAVE QUANTUM SENSOR DEVICE

BACKGROUND

Semiconductor wafers are circular pieces of semiconductor material, such as silicon, that are used to manufacture semiconductor chips. Generally, complex manufacturing processes are used to form numerous integrated circuits on a single wafer. The formation of such circuits on a wafer is called fabrication. After wafer fabrication, the wafer is cut into multiple pieces, called semiconductor dies, with each die containing one of the circuits. The cutting, or sawing, of the wafer into individual dies is called singulation. Dies are then coupled to a lead frame or substrate and are usually covered by a protective mold compound, which is subsequently sawn to produce a packaged device.

SUMMARY

A device comprises a U-shaped cell configured to contain a quantum gas, a first waveguide coupled to an inlet of the U-shaped cell, and a second waveguide coupled to an outlet of the U-shaped cell. The device also comprises a multilayer substrate including transmitter and receiver antennas that are aligned with the first and second waveguides, respectively, the substrate including a network of metal layers coupled to the transmitter and receiver antennas. The device also includes transmitter and receiver dies coupled to the transmitter and receiver antennas, respectively, by way of the network of metal layers, the substrate positioned between the U-shaped cell and the transmitter and receiver dies.

BRIEF DESCRIPTION OF THE DRAWINGS

FIGS. 4A1-4A2 are perspective views of a mmWave quantum sensor device substrate, in accordance with various examples.

FIGS. 7D1-7D2 are perspective views of a mmWave quantum sensor device having a vertical launch and a substrate thereof, in accordance with various examples.

DETAILED DESCRIPTION

Quantum devices can be useful for a variety of applications. For example, some quantum devices leverage the use of quantum gas-filled cells (e.g., glass cells) that can be interrogated using wireless signals to create tools, such as molecular clocks. For instance, a U-shaped cell may be filled with a dipolar gas, and a transmitter may provide a wireless signal in the mmWave range into an inlet of the cell, while a receiver receives the wireless signal at an outlet of the cell. (As used herein, a cell is defined as a sealed container or chamber that contains a quantum gas.) The molecules of the dipolar gas have certain properties, such as a rotational quantum state. If a specific quantum of electromagnetic energy (photon) is provided into the U-shaped cell, the molecules can transition from one rotational quantum state to a higher, excited state. This photon can be provided for example by a wireless signal passing through the cell having a specific triggering frequency (e.g., 121.624 GHz). The power of the signal at the receiver dips when the molecules absorb the photon at this frequency and transition from a lower energy rotational state to a higher energy state. Stated another way, the power of the signal at the receiver indicates when the wireless signal has the aforementioned triggering frequency (or equivalent energy). Thus, the power of the signal may be carefully monitored and used as feedback to hold the frequency of the wireless signal very steady at the triggering frequency (e.g., 121.624 GHz), and this steady oscillation may be useful to produce a molecular clock signal. Forming a structure that is capable of performing these functions, however, is technically challenging.

This disclosure describes various examples of structures that facilitate the wireless interrogation of quantum dipolar gases to build useful tools, such as molecular clocks. In examples, a device comprises a U-shaped cell configured to contain a quantum gas, a first waveguide coupled to an inlet of the U-shaped cell, and a second waveguide coupled to an outlet of the U-shaped cell. The device also comprises a multi-layer substrate including transmitter and receiver antennas that are aligned with the first and second waveguides, respectively, with the substrate including a network of metal layers coupled to the transmitter and receiver antennas. The device also includes transmitter and receiver dies coupled to the transmitter and receiver antennas, respectively, by way of the network of metal layers. The substrate is positioned between the U-shaped cell and the transmitter and receiver dies.

Figure 1:
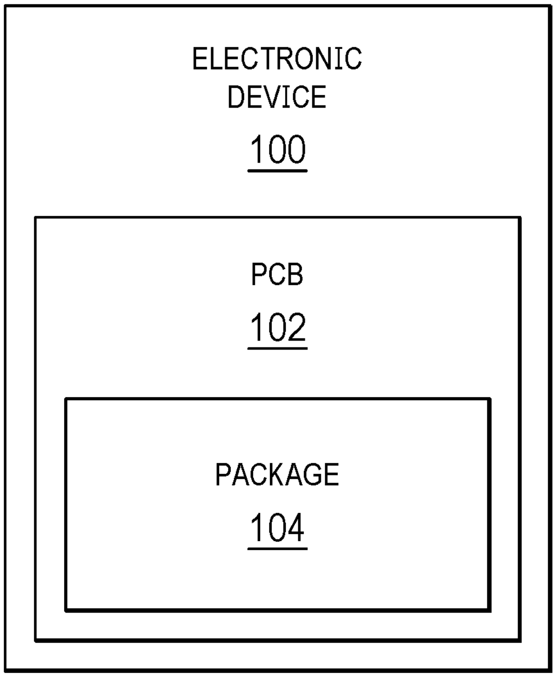
FIG. 1 is a block diagram of an electronic device containing a millimeter wave (mmWave) quantum sensor device, in accordance with various examples.

FIG. 1 is a block diagram of an electronic device 100 containing a millimeter wave (mmWave) quantum sensor device, in accordance with various examples. For example, the electronic device 100 may include any device that may benefit from the interrogation of quantum-gas filled cells, for example in the context of molecular clocks. For instance, the electronic device 100 may include personal computer, a laptop, a desktop, a notebook, a tablet, a smartphone, an appliance (e.g., refrigerator, television, audio player, video player, video recorder, lighting device, etc.), an automobile, an aircraft, a spacecraft, etc. The electronic device 100 may include a printed circuit board (PCB) 102, although other types of boards or substrates may be substituted in lieu of a PCB. In turn, a package device 104 (e.g., a mmWave quantum sensor device) may be coupled to the PCB 102. Various examples of the device 104 are described herein.

Figure 2A:
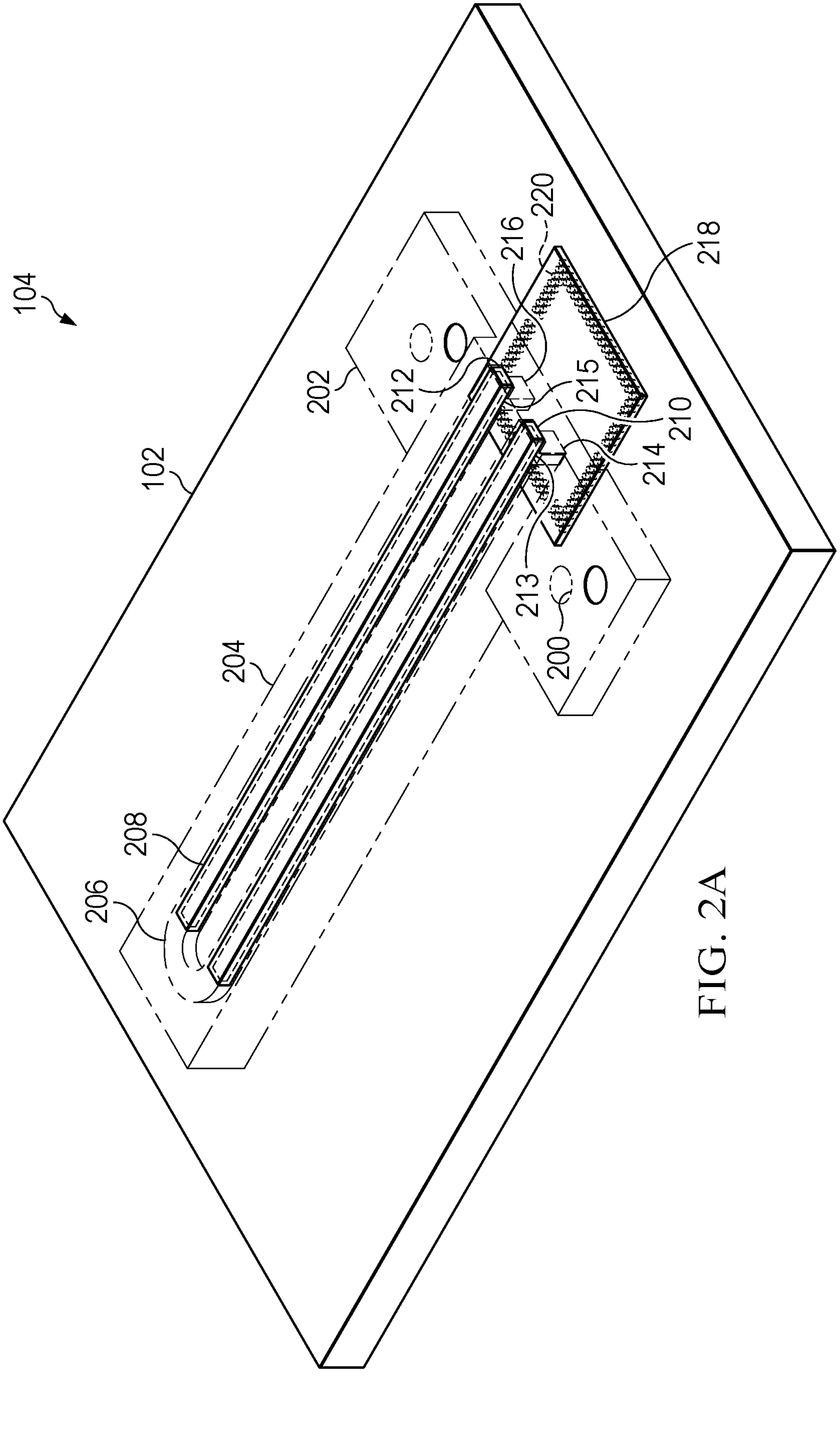
FIG. 2A is a perspective view of a mmWave quantum sensor device, in accordance with various examples.

FIG. 2A is a perspective view of a mmWave quantum sensor device 104, in accordance with various examples. The device 104 is coupled to the PCB 102, for example, by way of screws or pins 200. The device 104 includes a base 202 that facilitates coupling with the PCB 102 using the screws or pins 200. The base 202 may be composed of any suitable material, such as copper. The device 104 also includes an elongate member 204 extending lengthwise along the PCB 102, and away from the base 202. The elongate member 204 may be composed of any suitable material, such as copper. The elongate member 204 includes a U-shaped cavity 206, and the walls of the cavity 206 are covered (e.g., plated) with a metal, such as gold. The cavity 206 includes glass tubes 208, which are included in the non-curved portions of the cavity 206. In some examples, the cavity 206 includes glass tubes 208 that are positioned within both the non-curved and the curved portions of the cavity 206. In some examples, the cavity 206 has a circular, ovoid, or rectangular cross-sectional shape. In some examples, the glass tubes 208 have circular, ovoid, or rectangular cross-sectional shapes. Other shapes for the cavity 206 and the glass tubes 208 are contemplated and included in the scope of this disclosure. The cavity 206 and the glass tubes 208 positioned within the cavity 206 are collectively referred to herein as U-shaped cells.

The cavity 206 has smooth, internal surfaces to avoid dissipative losses that occur because at the mm Wave frequencies, the induced currents only propagate in a very thin, "skin depth" layer. A rougher internal surface will mean that the current will have to circulate in a longer path than it otherwise would when the roughness is less than the "skin depth."

The glass tubes 208 have a loss tangent no greater than 0.023, with a loss tangent above this range being disadvantageous because a higher loss tangent will mean unacceptably high dielectric loss and an unacceptably weak signal detected at the receive antenna. The glass tubes 208 have a thickness ranging from 90 microns to 150 microns, with a thickness below this range being disadvantageous because it would result in unacceptable mechanical fragility, and with a thickness above this range being disadvantageous because it would result in unacceptably higher losses. More generally, the elongate member 204, the cavity 206, and the glass tubes 208 are structurally suited to storing quantum gases, the quantum properties of which can be interrogated for a useful purpose, such as the construction of a molecular clock.

The U-shaped cell has ends 210, 212. An inlet 213 to the U-shaped cell is positioned a distance from the end 210 in the horizontal direction. More particularly, a midpoint of the inlet 213 in the horizontal direction is spaced from the end 210 by a distance that is approximately an integer multiple of half the wavelength of the signal that is to be transmitted through the U-shaped cell. Similarly, an outlet 215 of the U-shaped cell is positioned a distance from the end 212 in the horizontal direction. More particularly, a midpoint of the outlet 215 in the horizontal direction is spaced from the end 212 by a distance that is an integer multiple of half the wavelength of the signal that is to be transmitted through the U-shaped cell. The integers determining the two above-described distances may be the same or may be different. These horizontal distances facilitate the efficient transmission of signals in the U-shaped cell, for example by minimizing insertion losses and maximizing return losses.

A waveguide 214 is coupled to the inlet 213, and a waveguide 216 is coupled to the outlet 215. As used herein, a waveguide is defined as a hollow metallic or dielectric structure useful to guide and propagate electromagnetic waves. The waveguides 214, 216 may be vertically oriented, as shown. The waveguides 214, 216 may be composed of copper, and the interior walls of the waveguides 214, 216 may be plated with gold, for example. The waveguides 214, 216 have lengths ranging from 0.20 mm to 1 mm, with lengths below this range being disadvantageous because of manufacturing challenges, and with lengths above this range being disadvantageous because unacceptable added losses. The cross-sectional shapes of the waveguides 214, 216 may be rectangular.

Figure 2B:
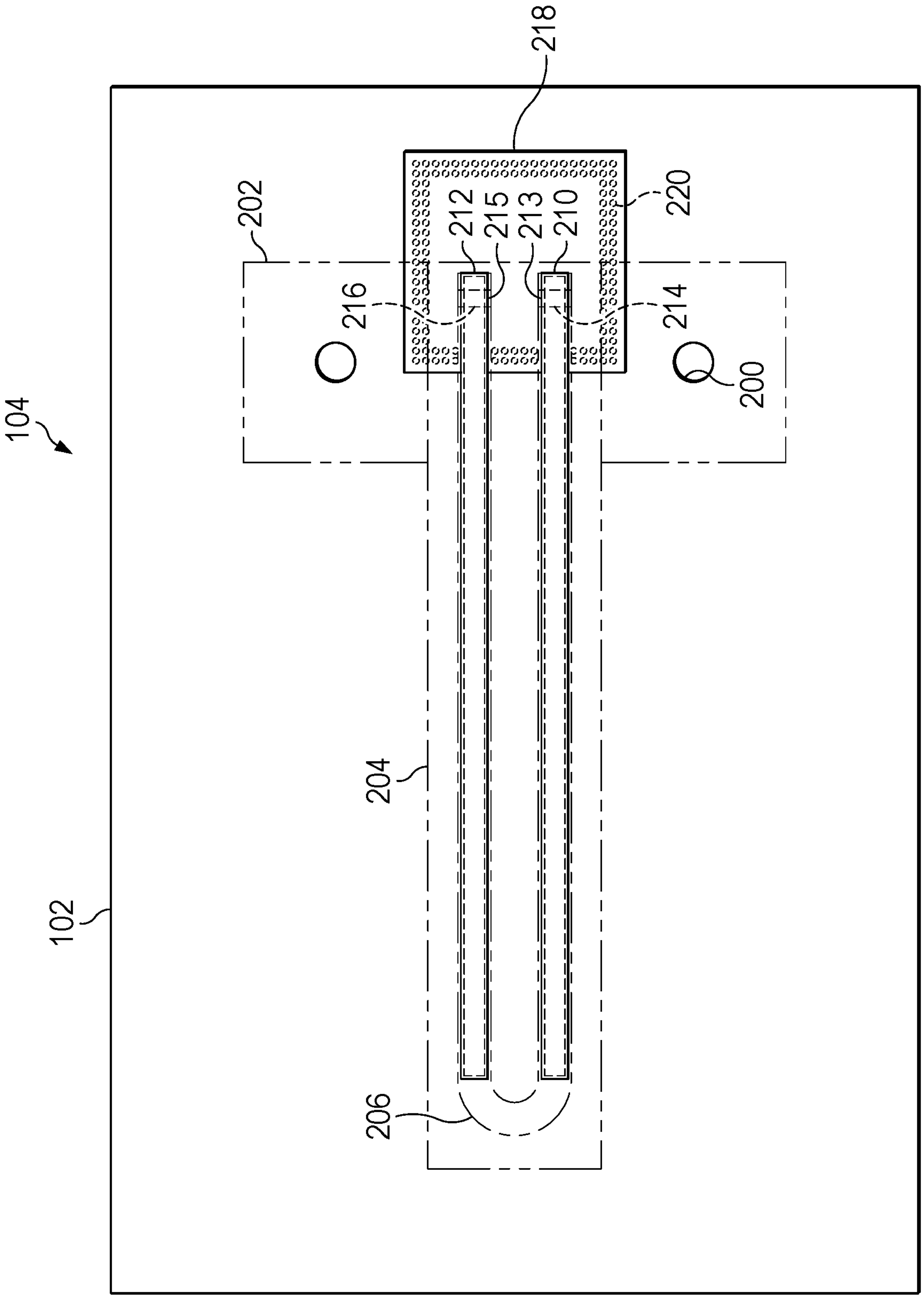
FIG. 2B is a top-down view of a mmWave quantum sensor device, in accordance with various examples.
Figure 2C:
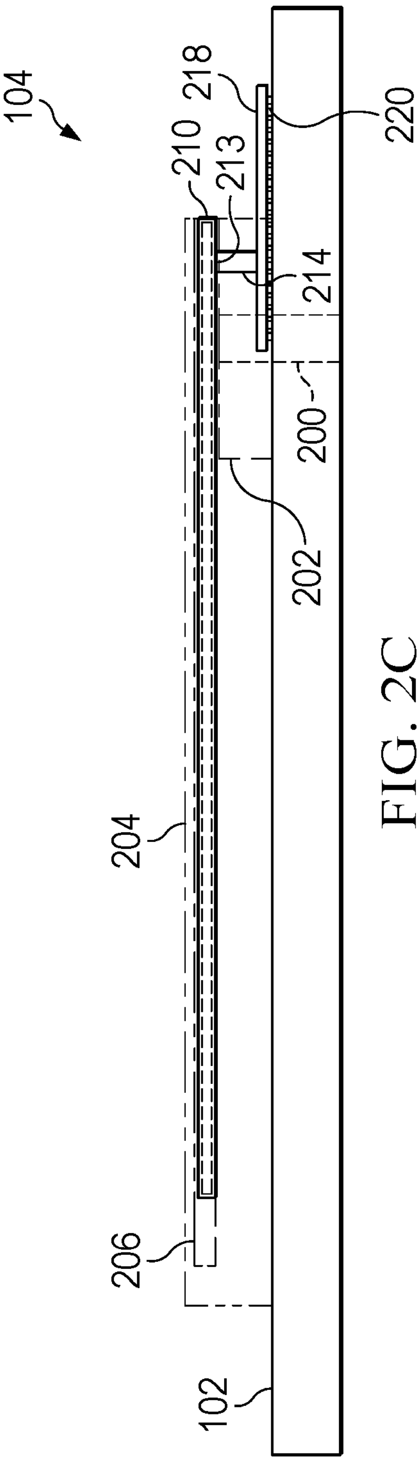
FIG. 2C is a profile view of a mmWave quantum sensor device, in accordance with various examples.
Figure 2D:
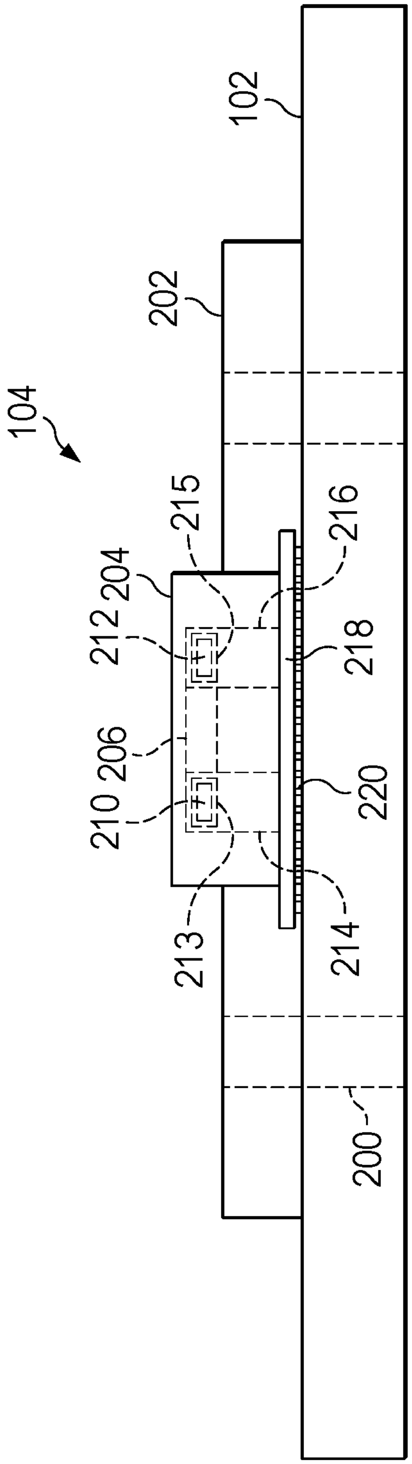
FIG. 2D is another profile view of a mmWave quantum sensor device, in accordance with various examples.

The device 104 includes a substrate 218. The substrate 218 includes metal bumps 220 arranged in a ball grid array (BGA) that couple to the PCB 102 and exchange data and/or power signals with the PCB 102. As described below, the substrate 218 comprises a transmit antenna vertically aligned with the waveguide 214 and the inlet 213, and a receive antenna vertically aligned with the waveguide 216 and the outlet 215. The substrate 218 carries signals between these antennas and transmit and receive dies coupled to the substrate 218. In examples, the antennas are coupled to a top surface of the substrate 218 (i.e., a surface facing the U-shaped cell) and the dies are coupled to a bottom surface of the substrate 218 (i.e., a surface facing away from the U-shaped cell). The antennas and dies are expressly shown in several drawings, such as FIGS. 4A1-4C, described below. FIG. 2B is a top-down view of the mmWave quantum sensor device 104, in accordance with various examples. FIG. 2C is a profile view of the mmWave quantum sensor device 104, in accordance with various examples. FIG. 2D is another profile view of the mmWave quantum sensor device 104, in accordance with various examples.

Figure 3:
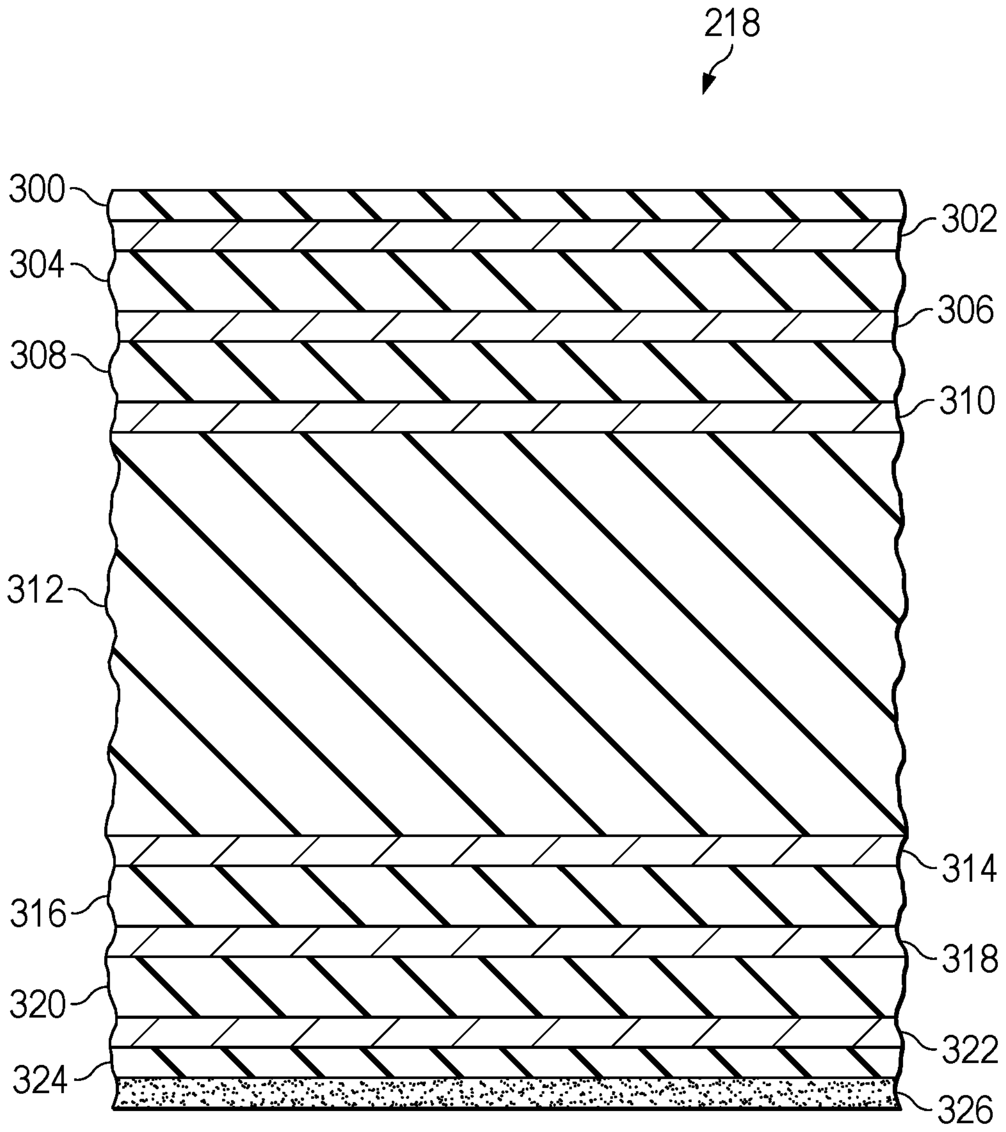
FIG. 3 is a schematic diagram of a mmWave quantum sensor device substrate, in accordance with various examples.

FIG. 3 is a schematic diagram of the mmWave quantum sensor device 104 substrate 218, in accordance with various examples. The substrate 218 comprises a stack of materials that is described from top to bottom. Specifically, the substrate 218 includes a solder mask layer 300. Under and contacting the solder mask layer 300 is a copper layer 302. A build-up layer 304 is under and contacting the copper layer 302. A copper layer 306 is under and contacting the build-up layer 304. A build-up layer 308 is under and contacting the copper layer 306. A copper layer 310 is under and contacting the build-up layer 308. A substrate core 312 is under and contacting the copper layer 310. A copper layer 314 is under and contacting the substrate core 312. A build-up layer 316 is under and contacting the copper layer 314. A copper layer 318 is under and contacting the build-up layer 316. A build-up layer 320 is under and contacting the copper layer 318. A copper layer 322 is under and contacting the build-up layer 320. A solder mask layer 324 is under and contacting the copper layer 322. An underfill layer 326 is under and contacting the solder mask layer 324. The structure of the substrate 218 as depicted in FIG. 3 is illustrative. The specific structure of the substrate 218 may vary from that expressly described herein.

Still referring to FIG. 3, the substrate core 312, possibly comprising materials with low loss at mmWave frequencies, provides mechanical support and serves as the foundation for the other layers. It typically contains a network of copper traces and vias that connect various components. Each of the solder mask layers 300, 324 is a protective layer that insulates the copper layers and prevents the copper layers from coming into contact with each other or with external objects. The copper layers 302, 306, 310, 314, 318, and 322 form a conductive network of copper traces and/or planes that carry signals and/or power. The build-up layers 304, 308, 316, and 320 comprise insulating material (e.g., prepreg and low loss dielectric film material) and/or copper that increase the routing density and reduce the size of the substrate 218 while providing more space for traces and components. The underfill layer 326 may be an epoxy-based material that protects and strengthens connections between the substrate 218 and the transmit and receive dies described below. The underfill layer 326 provides mechanical support and thermal management, ensuring that the connections between the substrate 218 and the transmit and receive dies remain stable under temperature fluctuations and mechanical stress.

FIGS. 4A1-4A2 are perspective views of the mmWave quantum sensor device 104 substrate 218, in accordance with various examples. FIGS. 4A1-4A2 depict a simplified version of the substrate 218 that omits some structures that are included in the substrate 218 to simplify explanation and illustration. The device 104 includes a transmit die 400. A device side 402 of the transmit die 400 includes circuitry. The device side 402 of the transmit die 400 is coupled to vias 404 and 406 that are coupled to a balun 408. As used herein, a balun is a device that converts between balanced and unbalanced electrical signals. The balun 408 is configured to convert a differential signal to a single-ended signal. The balun 408 is coupled to a quarter-wave transformer line to match the impedance between the balun and a stripline 412. As used herein, a stripline is a transmission line including a conductor positioned between multiple grounded structures, allowing for controlled signal propagation and mitigating electromagnetic interference. The output line 410 is coupled to the stripline 412. The stripline 412, in turn, is coupled to a via 416. The via 416 is surrounded by grounded planes 414 and 420, as well as grounded pillars 418 to form a coaxial via. The via 416 is coupled to a stripline 422, which, in turn, is coupled to a stripline 424. The striplines 422, 424 are surrounded by grounded pillars 430. The stripline 424 is coupled to a via 426, which is coupled to a transmit antenna 428 (e.g., a patch antenna). The transmit antenna 428 is surrounded by grounded pillars 430.

The grounded planes and pillars described and depicted herein are configured to mitigate cross-talk, mitigate electromagnetic interference (EMI), and improve signal integrity. The grounded planes and pillars described herein are spaced a distance from signal-carrying metals (e.g., striplines, vias, antennas, etc.), and this distance ranges between 90 microns and 120 microns, with a distance below this range being disadvantageous because the signal could couple to the planes and pillars, and with a distance above this range being disadvantageous because of unacceptably diminished shielding efficacy. The grounded pillars 430 have a pitch ranging from 180 microns to 200 microns, with a pitch below than this range being disadvantageous because it would be impossible to manufacture, and with a pitch above this range being disadvantageous because the excessive distance between the vias could make the shielding unacceptably ineffective.

The device 104 includes electromagnetic bandgap (EBG) structures 432, which surround the striplines 412, 422, and 424, the vias 416 and 426, and the transmit antenna 428, as well as the grounded pillars 430. The EBG structures 432 includes high-impedance surfaces that mitigate cross-talk between the transmit antenna 428 and a receive antenna (described below). The EBG structures 432 form a notch filter for electromagnetic surface waves. The pitch between EBG structures 432 and the sizes of the components of each EBG structure 432 (i.e., vias and rhomboidal structures within the EBG structures 432) define the inductance and the capacitance of each EBG structure 432, which, in turn, defines a resonant RLC circuit. By tuning these physical dimensions (i.e., pitch, sizes of EBG components) so the RLC resonance happens at the frequency of operation (e.g., 121.624 GHz) the notch band is located at the appropriate frequency to create the desired high impedance surface. The pitch between EBG structures 432 is approximately 350 microns and the sizes of the smaller rhombus sides are 146 microns. The acceptable tolerance in these dimensions is +/−20 microns.

The transmit antenna 428 is vertically aligned with the waveguide 214. In examples, the grounded pillars 430 and the EBG structures 432 surround the waveguide 214.

Comparing FIGS. 3 and 4A1-4A2, a ground plane is in the copper layer 322, and this ground plane mitigates cross-talk, EMI, and facilitates signal integrity. The balun 408, output line 410, and stripline 412 are in the copper layer 318. The via 416 extends from the copper layer 318, through the copper layers 314 and 310, to the copper layer 306. The copper layer 314 also includes a ground plane, so the ground planes of copper layers 322 and 314 protect the signal integrity in the copper layer 318. The striplines 422 and 424 are part of copper layer 306. The transmit antenna 428 is part of the copper layer 302.

The substrate 218 comprises grounded pillars 431 and EBG structures 433, which surround the waveguide 216. The grounded pillars 418, 431 have the same physical features, spacing, density, etc., as the grounded pillars 430. The EBG structures 433 have the same physical features, spacing, density, etc., as the EBG structures 432. The waveguide 216 surrounds and is vertically aligned with the receive antenna 434 (e.g., a patch antenna, which is defined as an antenna that includes a flat, rectangular, or circular radiating element configured to radiate electromagnetic waves). A via 436 couples the receive antenna 434 with a stripline 438. The stripline 438 is coupled to the stripline 440. A via 442 couples the stripline 440 to a stripline 452. The via 442 is surrounded by grounded planes 444 and 450, as well as by grounded pillars 446. The stripline 452 is coupled to a stripline 454. The stripline 454 is coupled to a via 456, which couples to receive die 462. Ground vias 458 couple multiple ground planes (e.g., ground planes in the copper layers 314 and 322, such as ground plane 460) to each other. In examples, the transmit and receive dies 400, 462 are horizontally co-planar with, and do not extend farther away from the substrate 218 than, the metal bumps 220 (FIG. 2A).

Figure 4B:
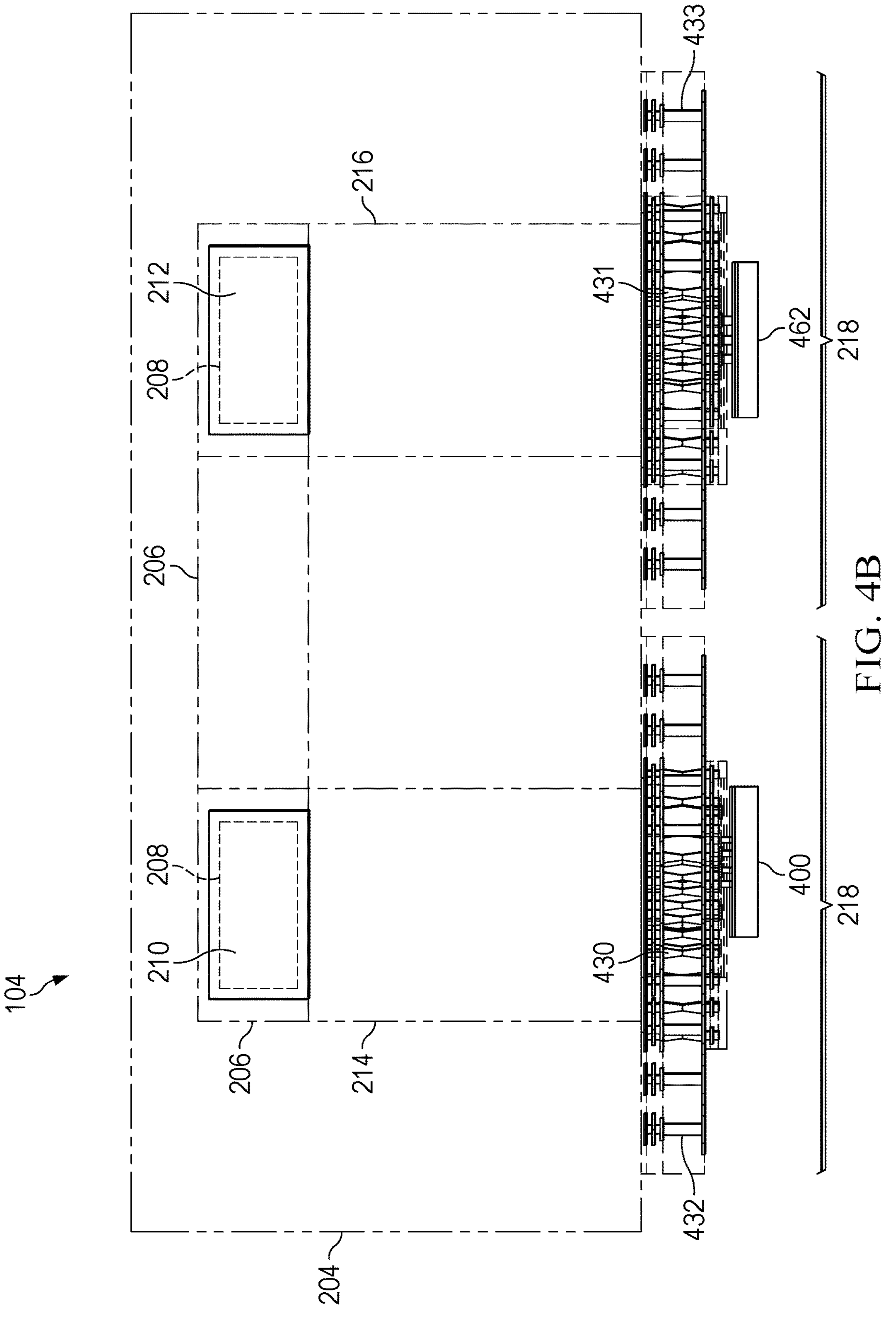
FIG. 4B is a frontal view of a mmWave quantum sensor device substrate, in accordance with various examples.
Figure 4C:
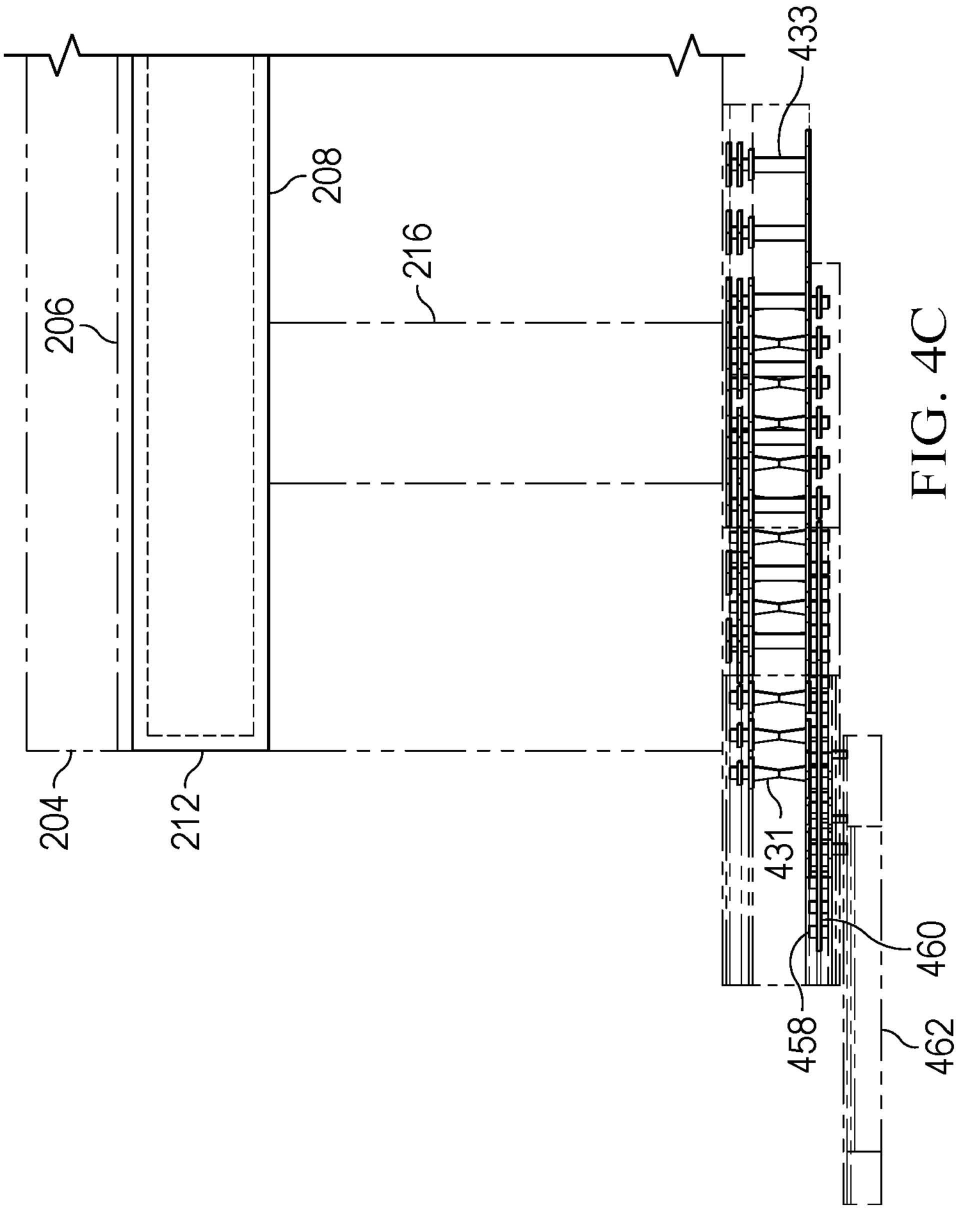
FIG. 4C is a profile view of a mmWave quantum sensor device substrate, in accordance with various examples.

Comparing FIGS. 3 and 4A1-4A2, ground planes are in the copper layers 322 and 318, and this ground plane mitigates cross-talk, EMI, and facilitates signal integrity in the copper layer 314. The striplines 452 and 454 are in the copper layer 318. The via 442 extends from the copper layer 318, through the copper layers 314 and 310, to the copper layer 306. The striplines 438, 440 are part of copper layer 306. The receive antenna 434 is part of the copper layer 302. FIG. 4B is a frontal view of the mmWave quantum sensor device 104 substrate 218, in accordance with various examples. FIG. 4C is a profile view of the mmWave quantum sensor device 104 substrate 218, in accordance with various examples.

Figure 5A:
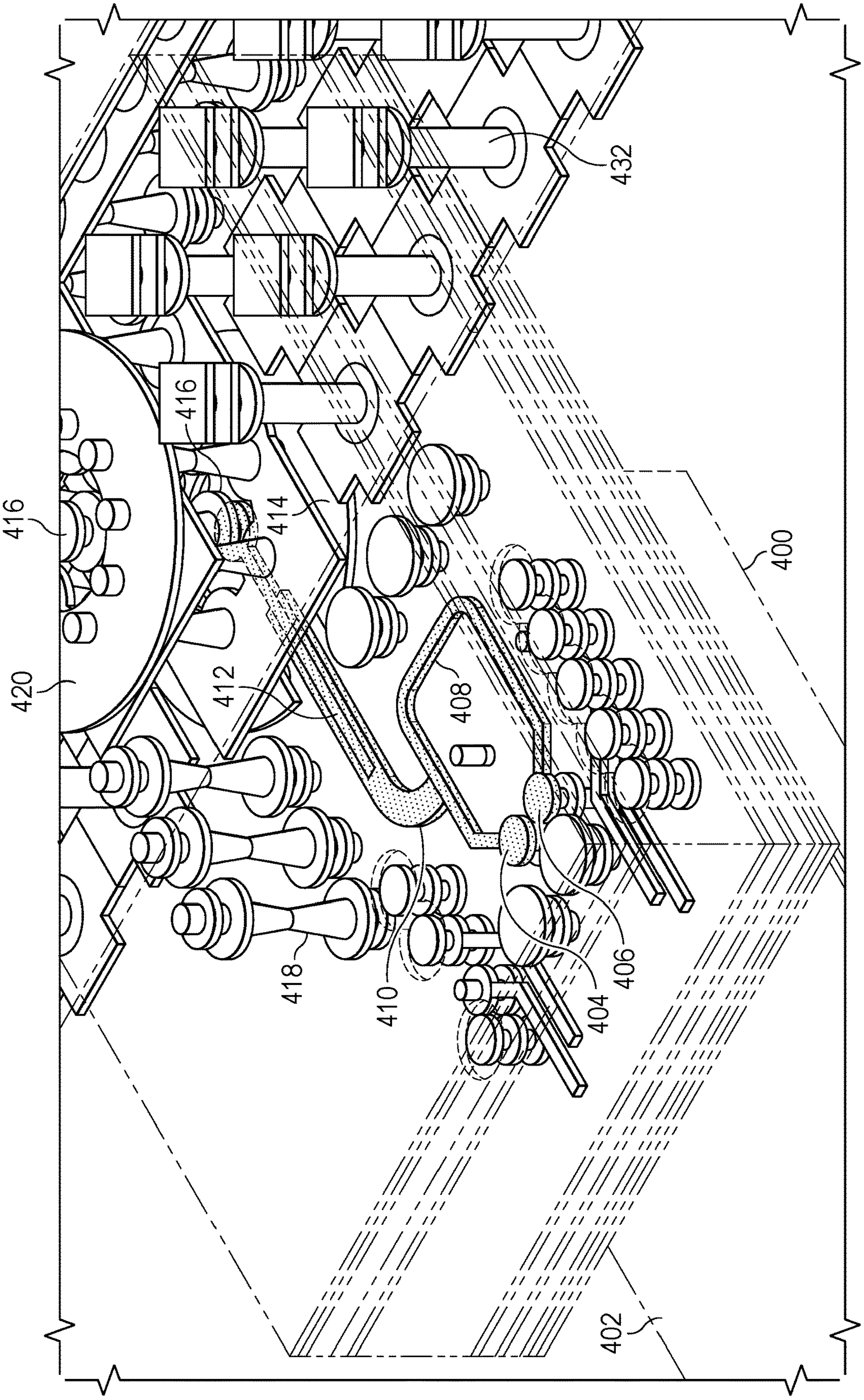
FIG. 5A is a perspective view of a mmWave quantum sensor device substrate coupled to a transmitter die, in accordance with various examples.
Figure 5B:
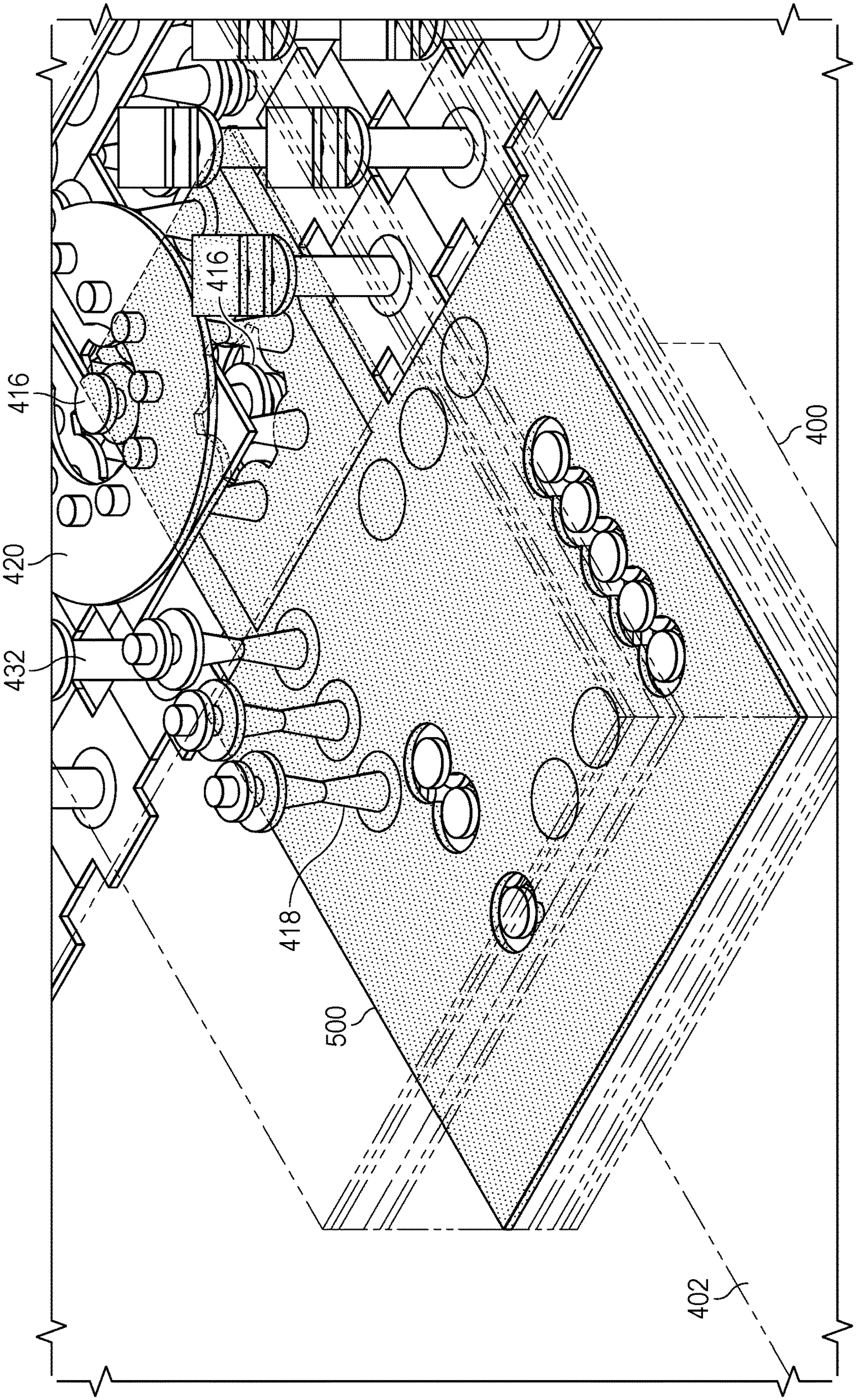
FIG. 5B is another perspective view of a mmWave quantum sensor device substrate coupled to a transmitter die, in accordance with various examples.
Figure 5C:
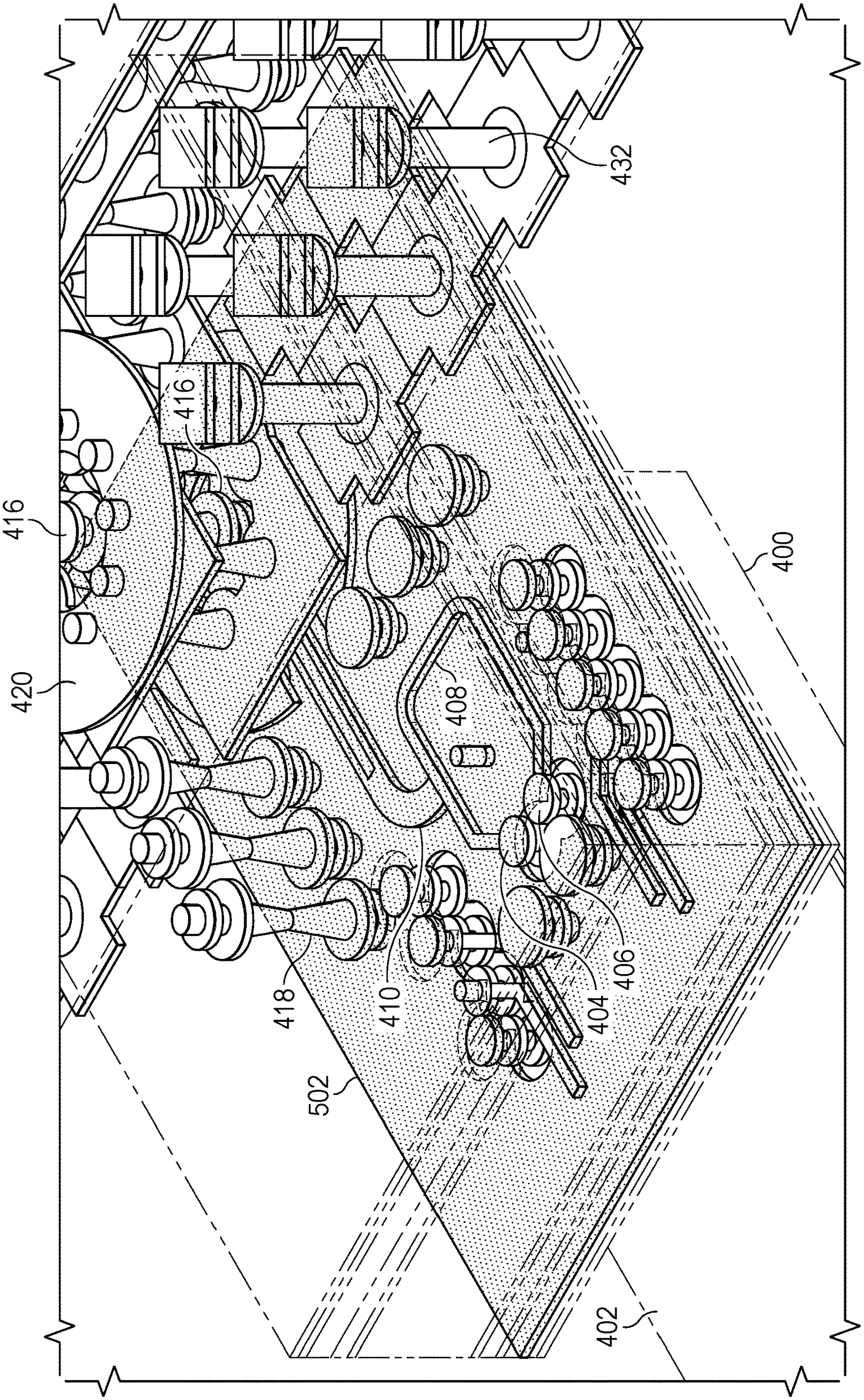
FIG. 5C is another perspective view of a mmWave quantum sensor device substrate coupled to a transmitter die, in accordance with various examples.
Figure 5D:
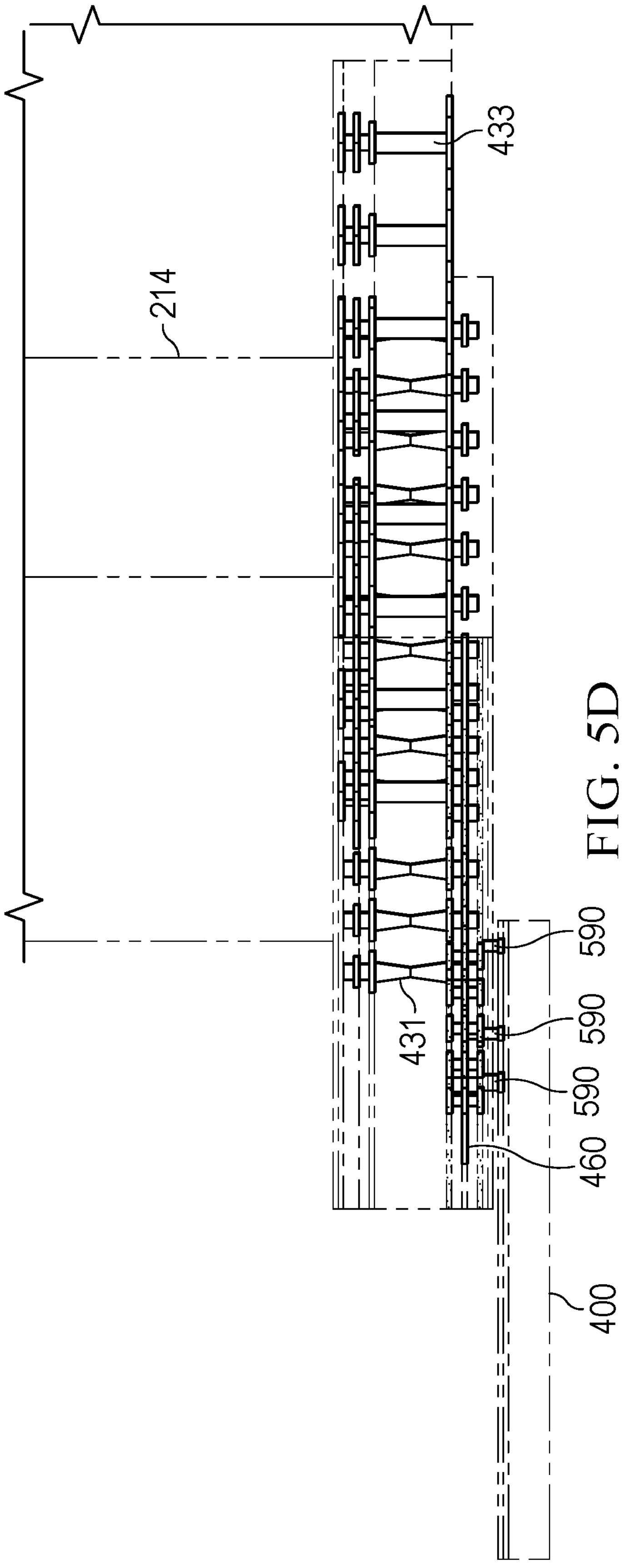
FIG. 5D is a profile view of a mmWave quantum sensor device substrate coupled to a transmitter die, in accordance with various examples.

FIG. 5A is a close-up perspective view of the balun 408 and structures in proximity to the balun 408, such as the transmit die 400, in accordance with various examples. FIG. 5B is a close-up perspective view of ground plane 500 in the copper layer 314, in accordance with various examples. FIG. 5C is a close-up perspective view of ground plane 502 in the copper layer 322, in accordance with various examples. FIG. 5D is a profile view of the structures of FIGS. 5A, 5B, and 5C, as well as the transmit die 400, in accordance with various examples. The transmit die 400 is coupled to the substrate 218 by way of vias 590.

Figure 5E:
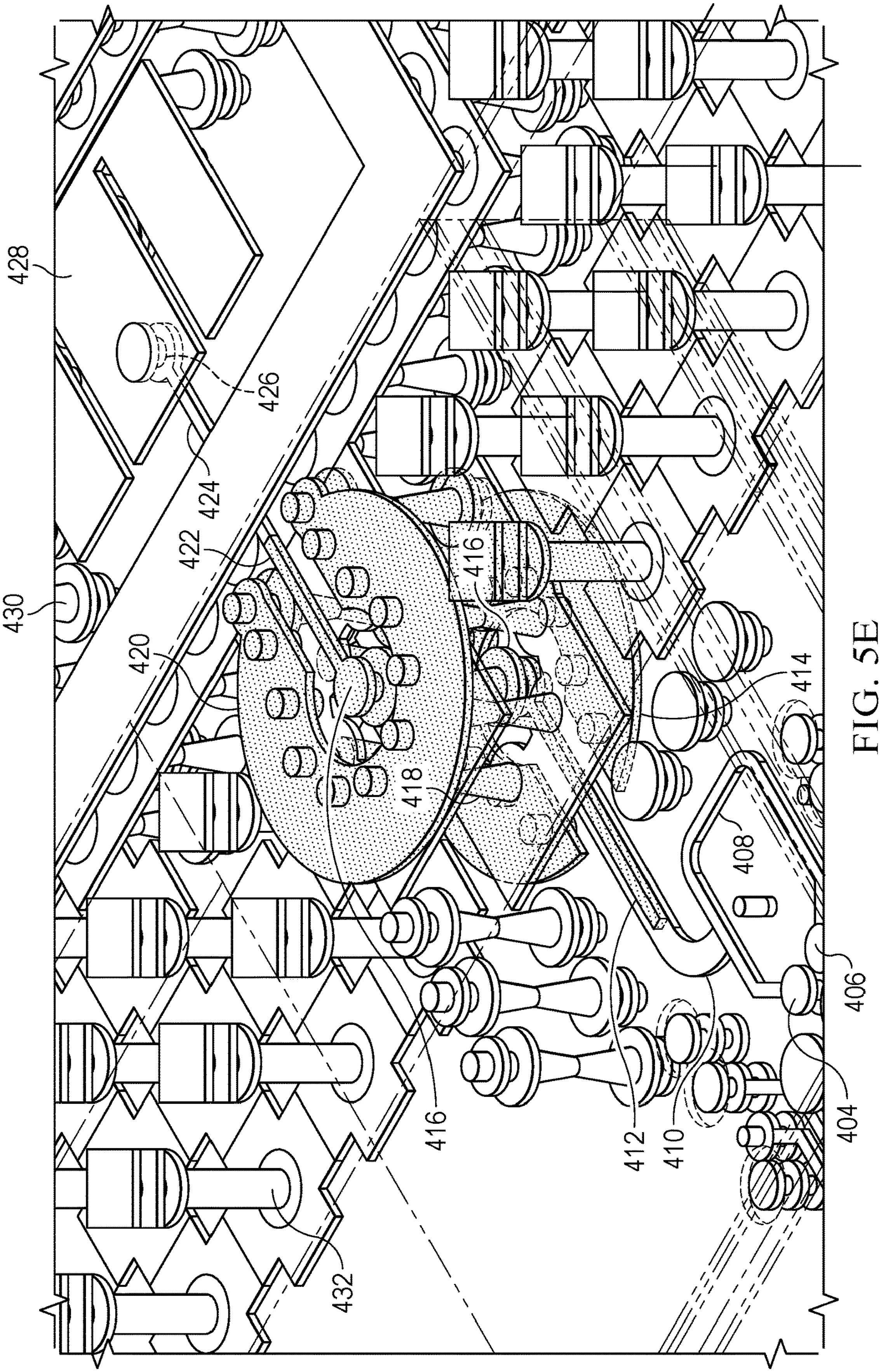
FIG. 5E is a perspective view of a mmWave quantum sensor device substrate including a via coupling multiple striplines in different substrate layers, in accordance with various examples.
Figure 5F:
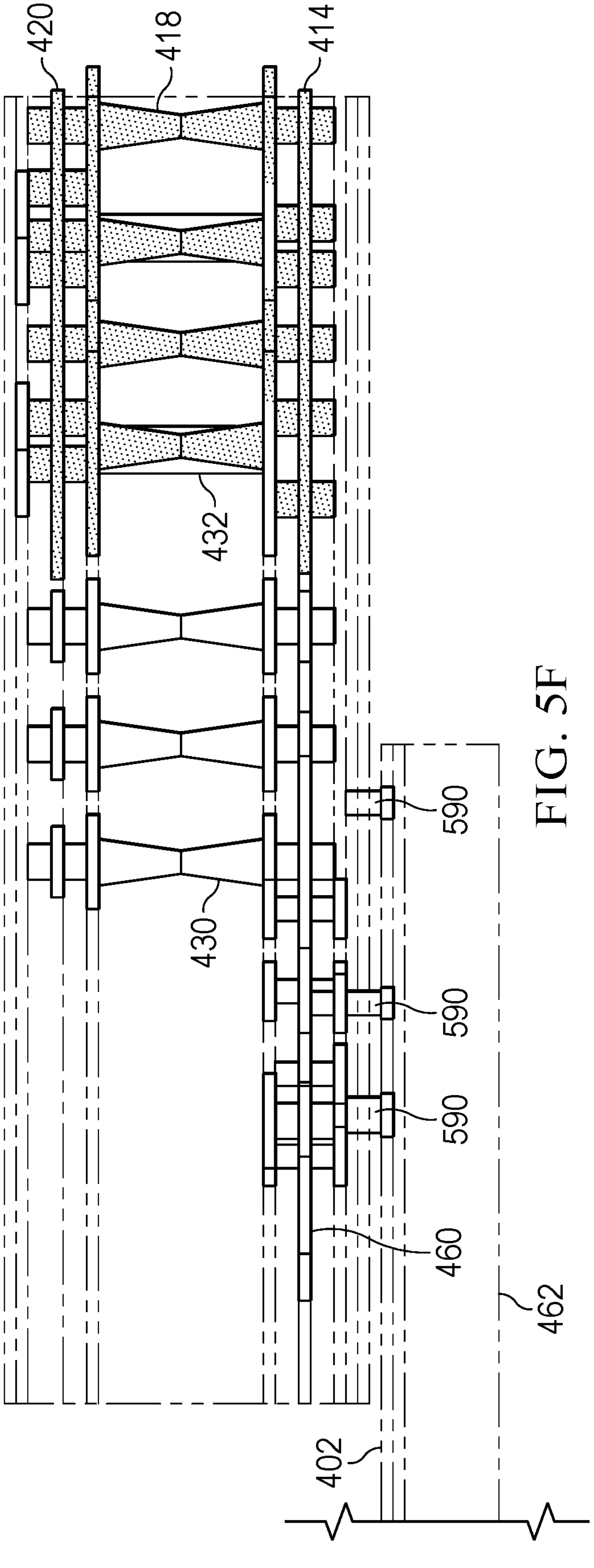
FIG. 5F is a profile view of a mmWave quantum sensor device substrate including a via coupling multiple striplines in different substrate layers, in accordance with various examples.
Figure 5G:
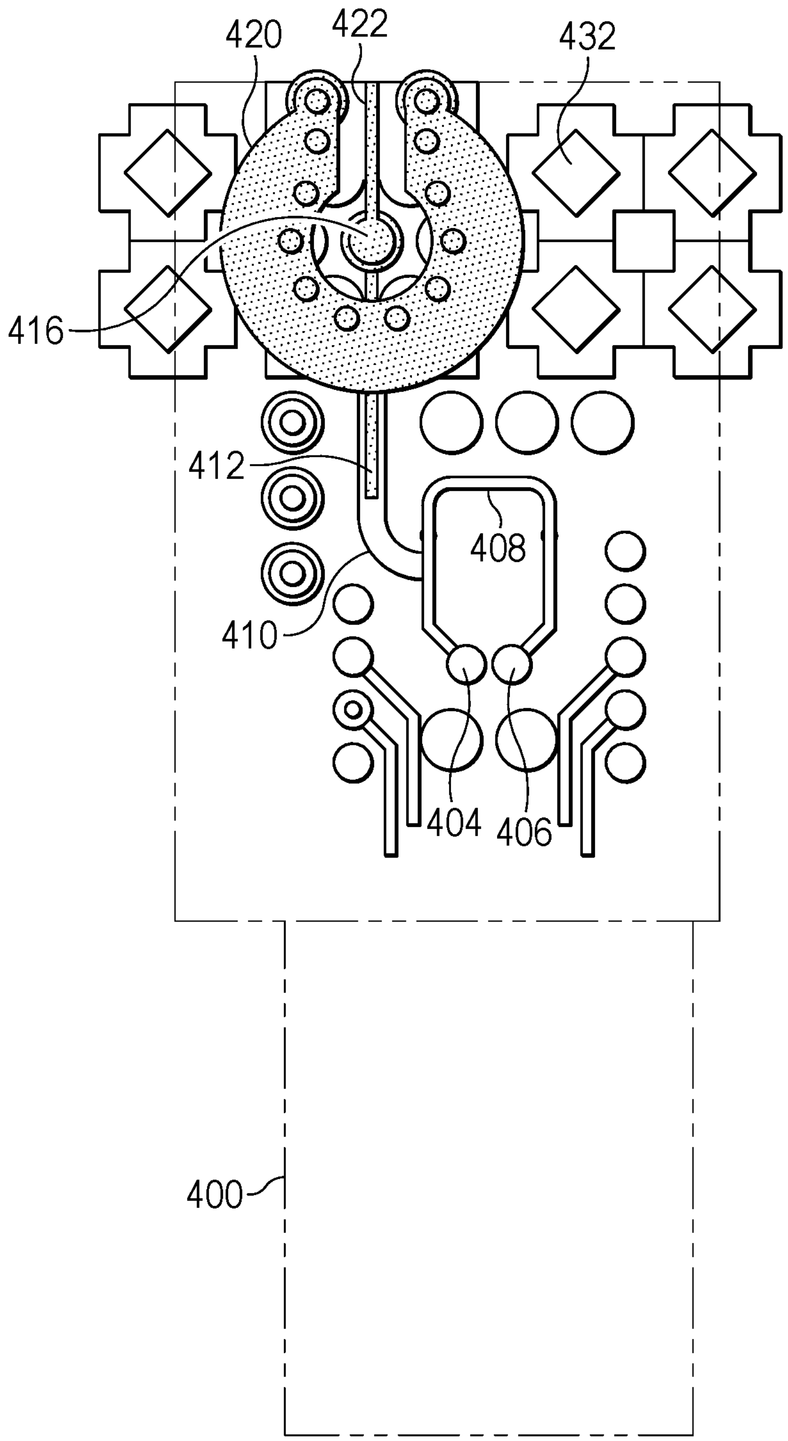
FIG. 5G is a top-down view of a mmWave quantum sensor device substrate including a via coupling multiple striplines in different substrate layers, in accordance with various examples.

FIG. 5E is a close-up perspective view of the via 416 and the ground planes 414, 420, as well as the grounded pillars 418 and the striplines 412 and 422, in accordance with various examples. FIG. 5F is a close-up profile view of the structures of FIG. 5E, in accordance with various examples. FIG. 5G is a close-up top-down view of the structures of FIG. 5E, in accordance with various examples.

Figure 5H:
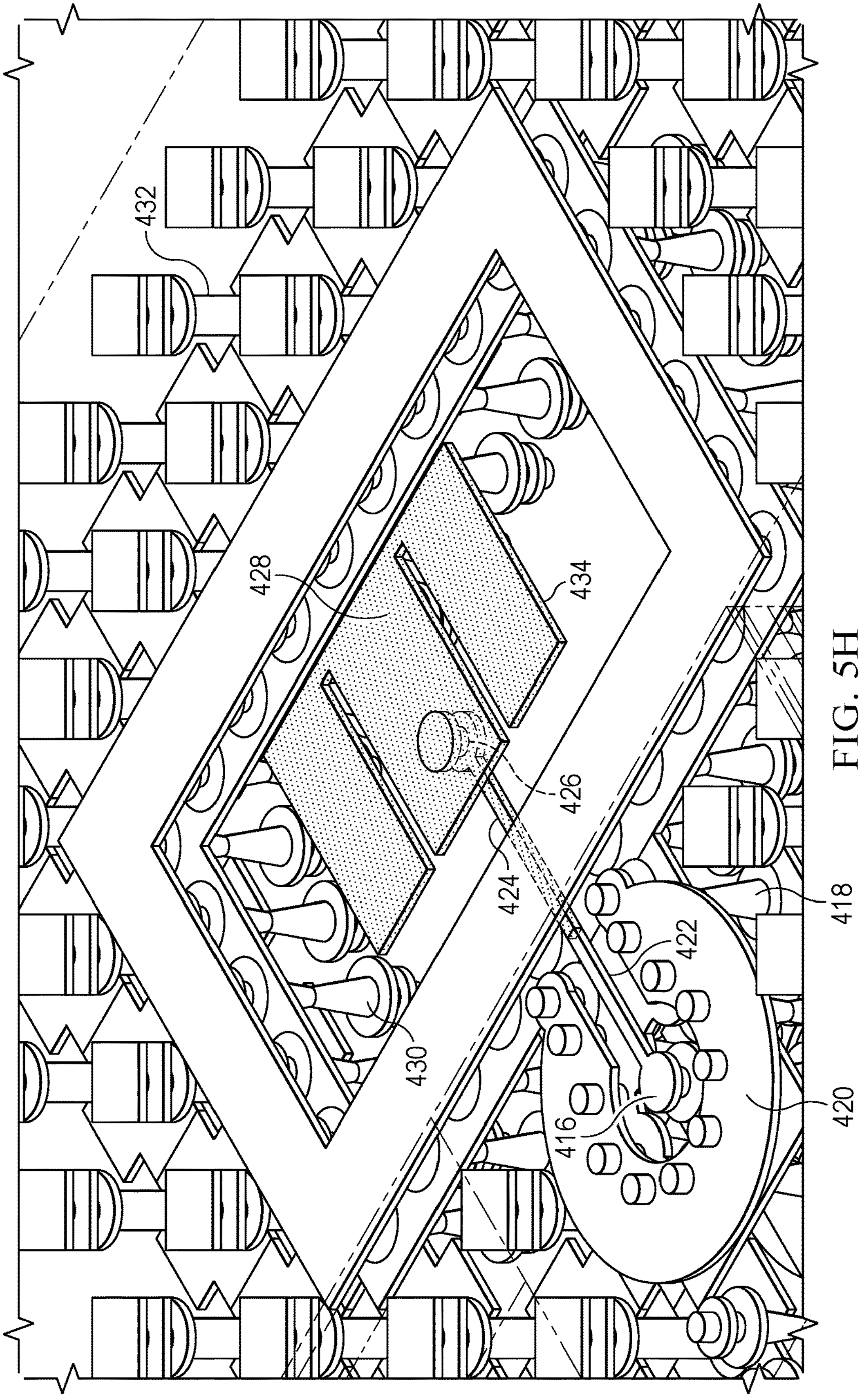
FIG. 5H is a perspective view of a mmWave quantum sensor device substrate including a transmitter patch antenna coupled to a stripline, in accordance with various examples.
Figure 5I:
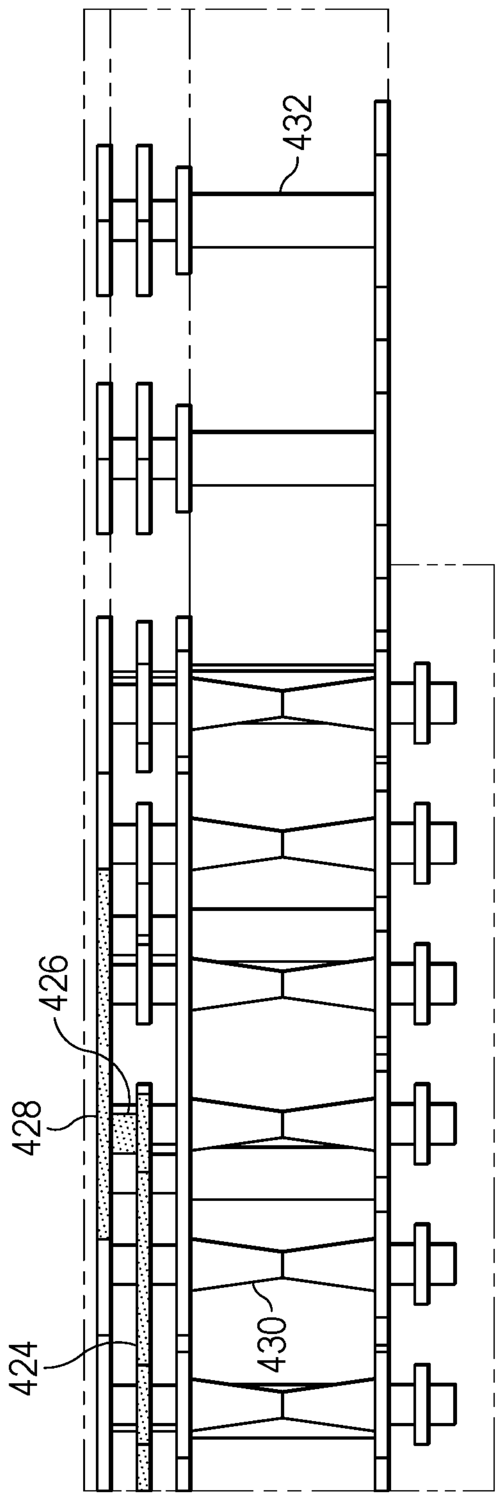
FIG. 5I is a profile view of a mmWave quantum sensor device substrate including a transmitter patch antenna coupled to a stripline, in accordance with various examples.
Figure 5J:
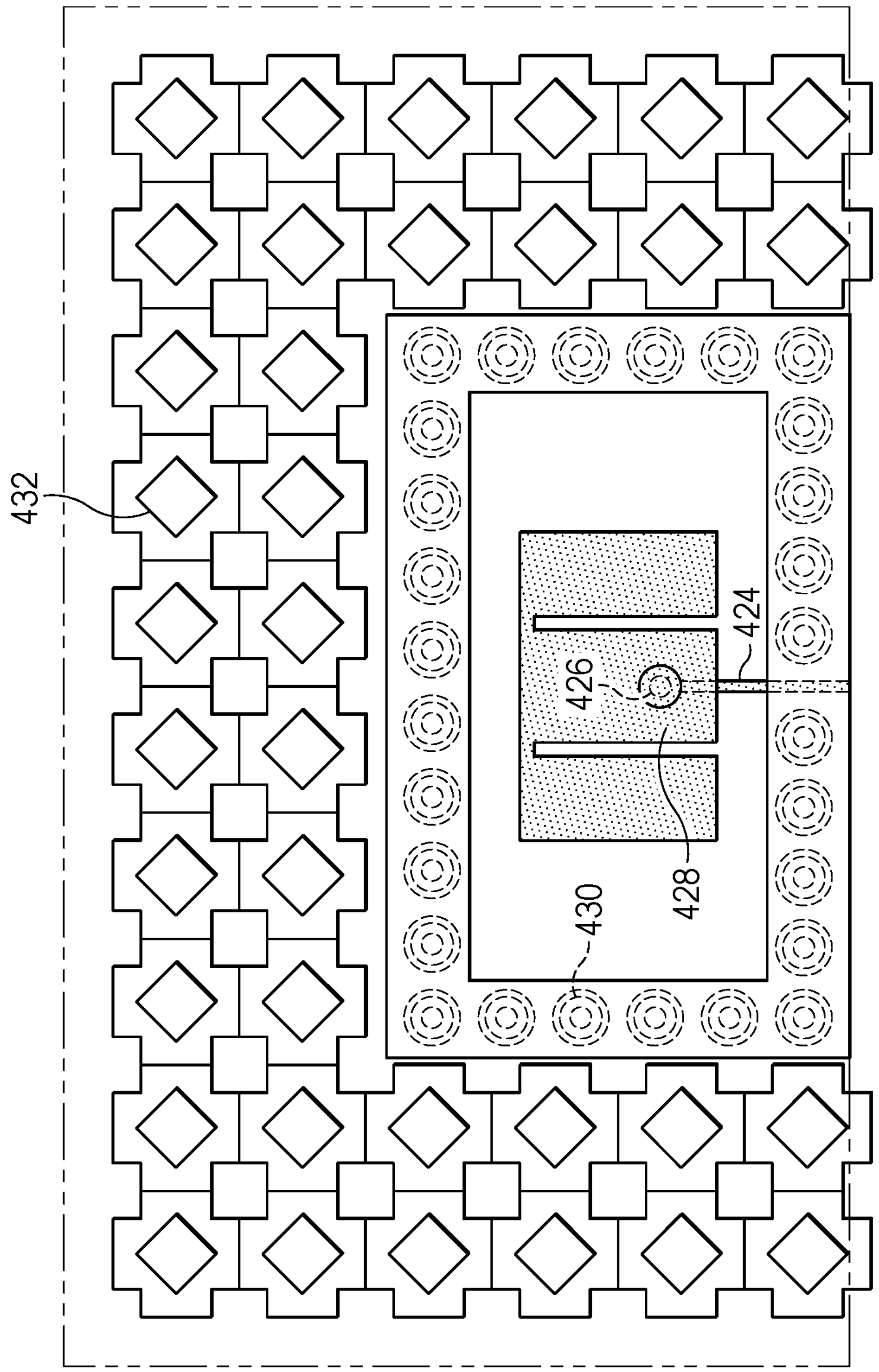
FIG. 5J is a top-down view of a mmWave quantum sensor device substrate including a transmitter patch antenna coupled to a stripline, in accordance with various examples.
Figure 5K:
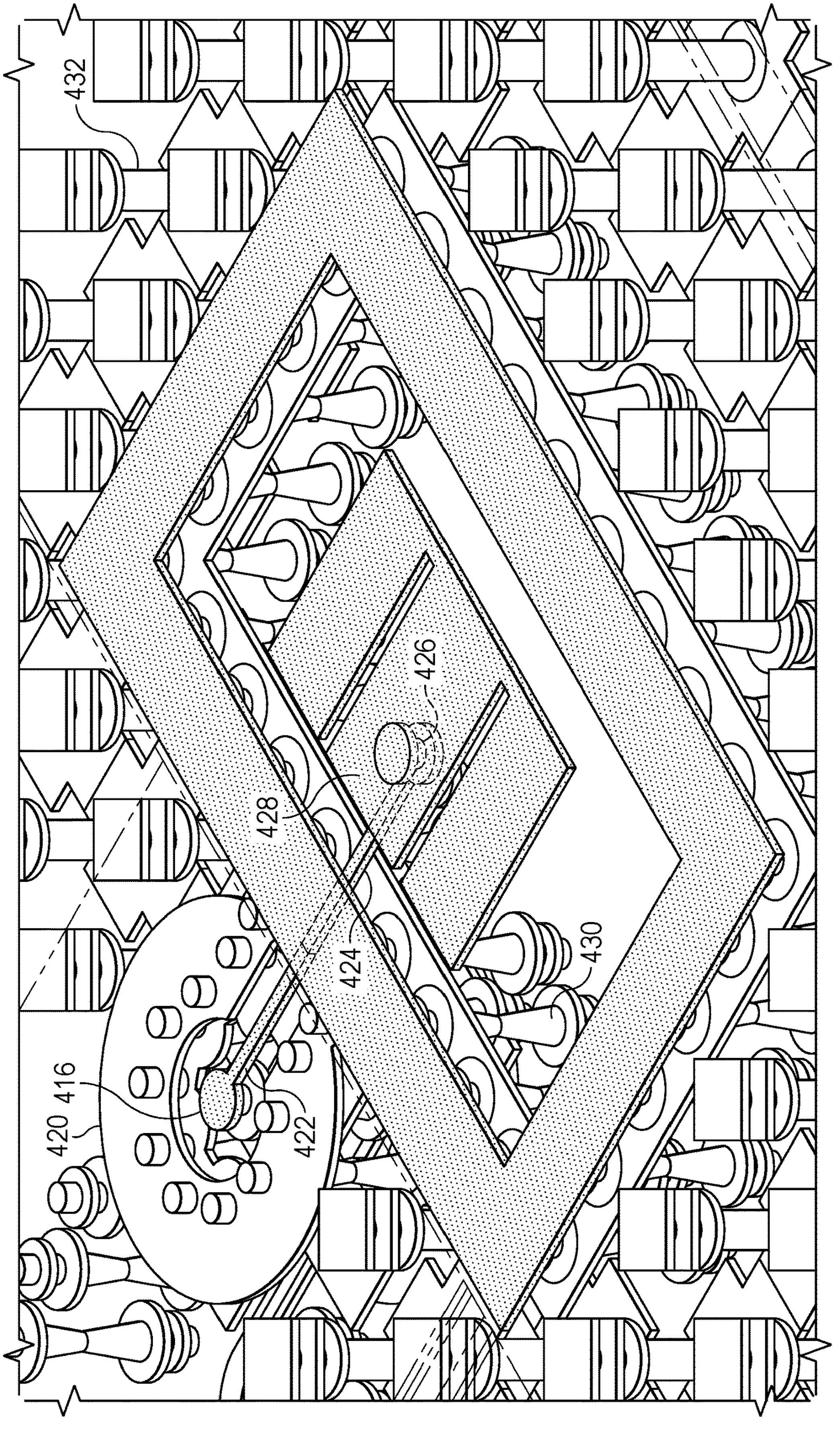
FIG. 5K is another perspective view of a mmWave quantum sensor device substrate including a transmitter patch antenna coupled to a stripline, in accordance with various examples.

FIG. 5H is a close-up perspective view of the transmit antenna 428 and the stripline 424, as well as the grounded pillars 430, in accordance with various examples. FIG. 5I is a close-up profile view of the structures of FIG. 5H, in accordance with various examples. FIG. 5J is a close-up top-down view of the structures of FIG. 5H, in accordance with various examples. FIG. 5K is another close-up perspective view of the structures of FIG. 5H, in accordance with various examples.

Figure 6A:
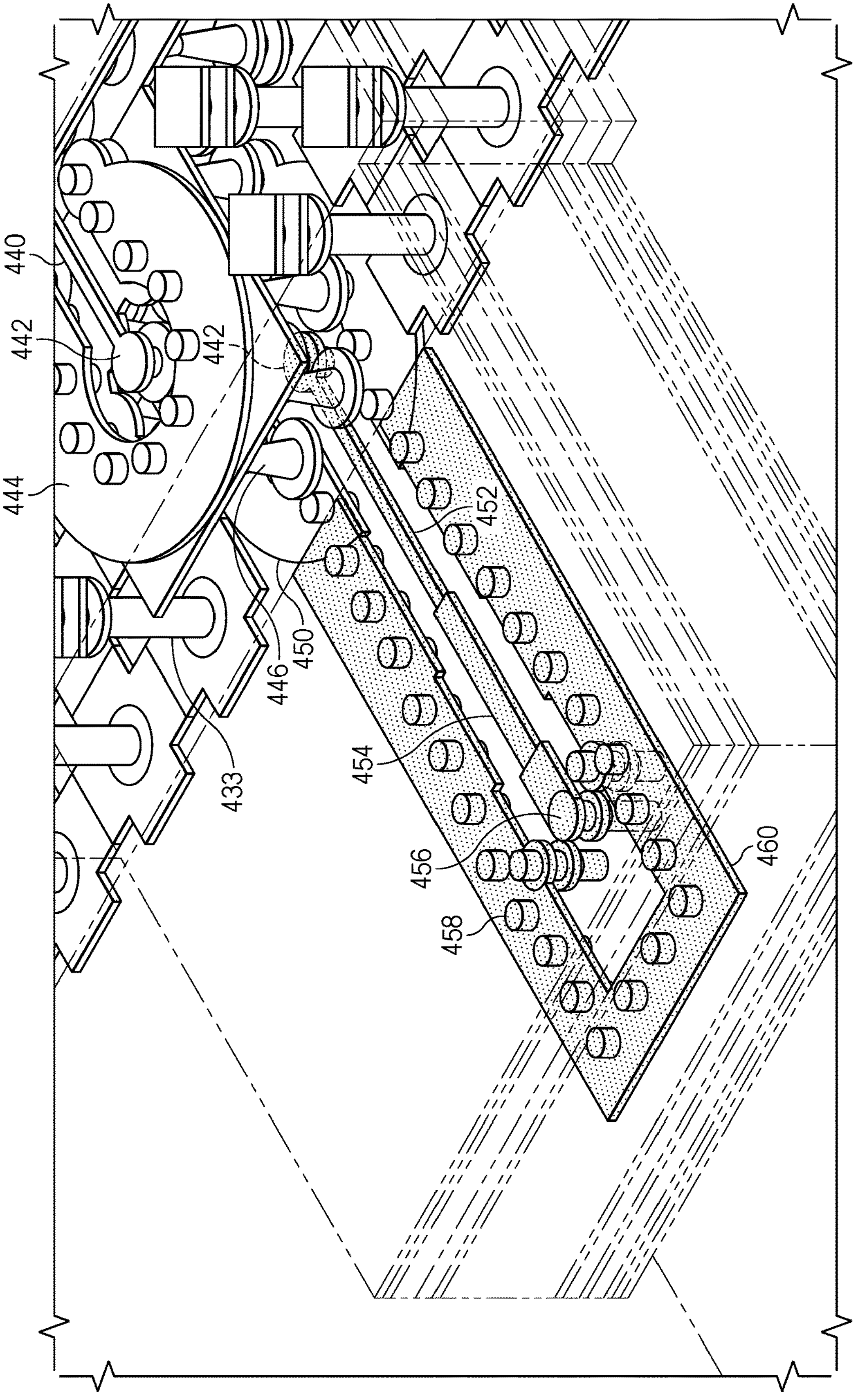
FIG. 6A is a perspective view of a mmWave quantum sensor device substrate including a stripline coupled to a receiver die, in accordance with various examples.
Figure 6B:
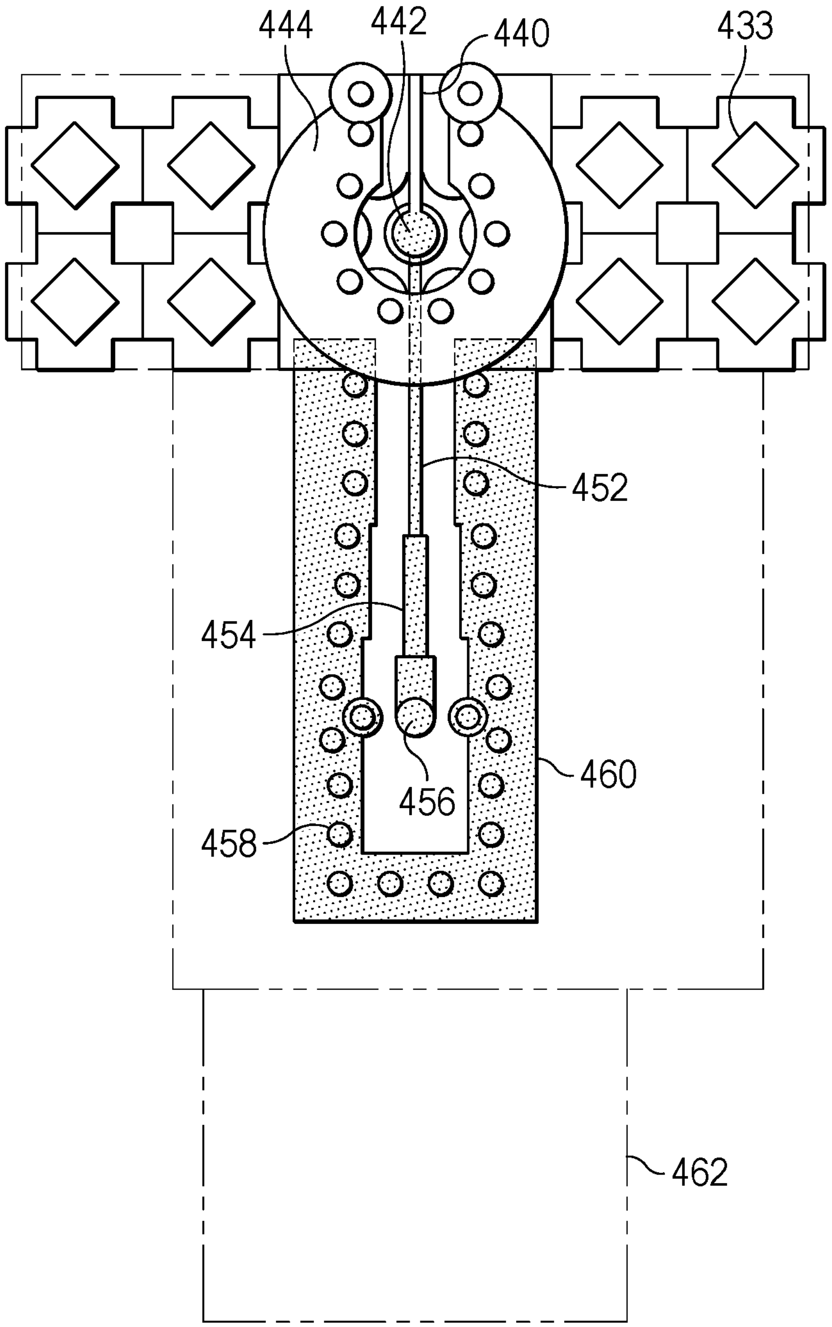
FIG. 6B is a top-down view of a mmWave quantum sensor device substrate including a stripline coupled to a receiver die, in accordance with various examples.
Figure 6C:
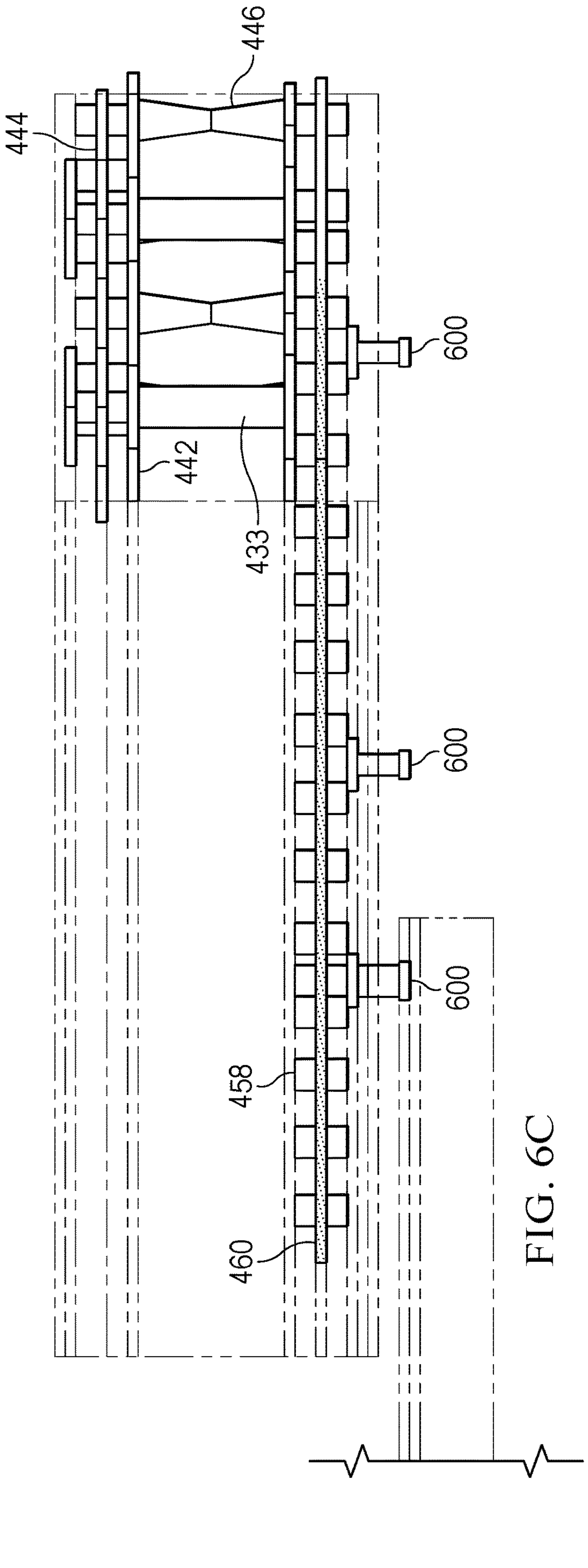
FIG. 6C is a profile view of a mmWave quantum sensor device substrate including a stripline coupled to a receiver die, in accordance with various examples.
Figure 6D:
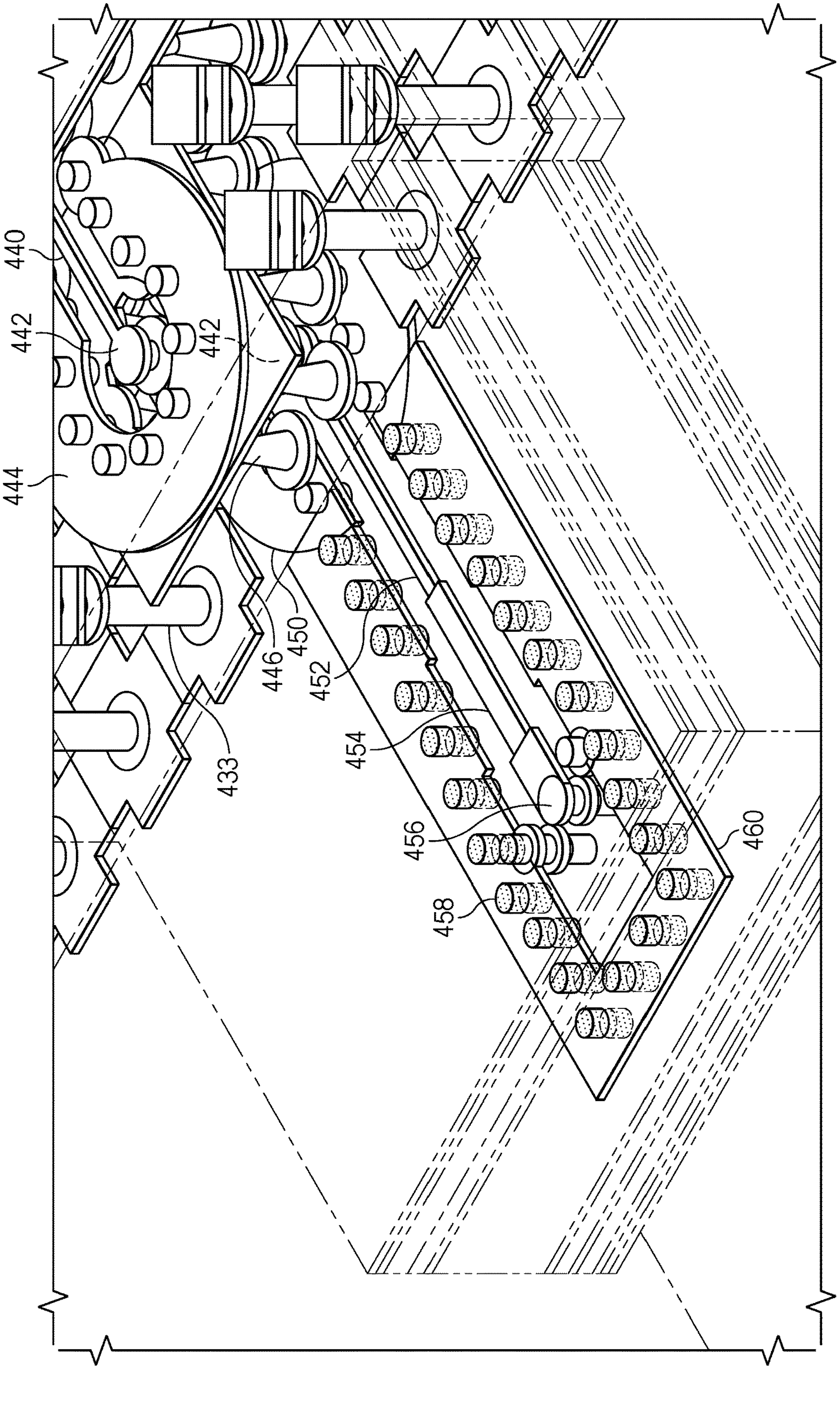
FIG. 6D is a perspective view a mmWave quantum sensor device substrate including vias coupling multiple metal grounded members to each other, in accordance with various examples.

FIG. 6A is a close-up perspective view of the stripline 454, ground plane 460, and ground vias 458, in accordance with various examples. FIG. 6B is a close-up top-down view of the structures of FIG. 6A, in accordance with various examples. FIG. 6C is a close-up profile view of the structures of FIG. 6A, as well as of the receive die 462, in accordance with various examples. The receive die 462 is coupled to the substrate 218 by way of vias 600. FIG. 6D is a close-up perspective view of the ground vias 458, in accordance with various examples.

Figure 6E:
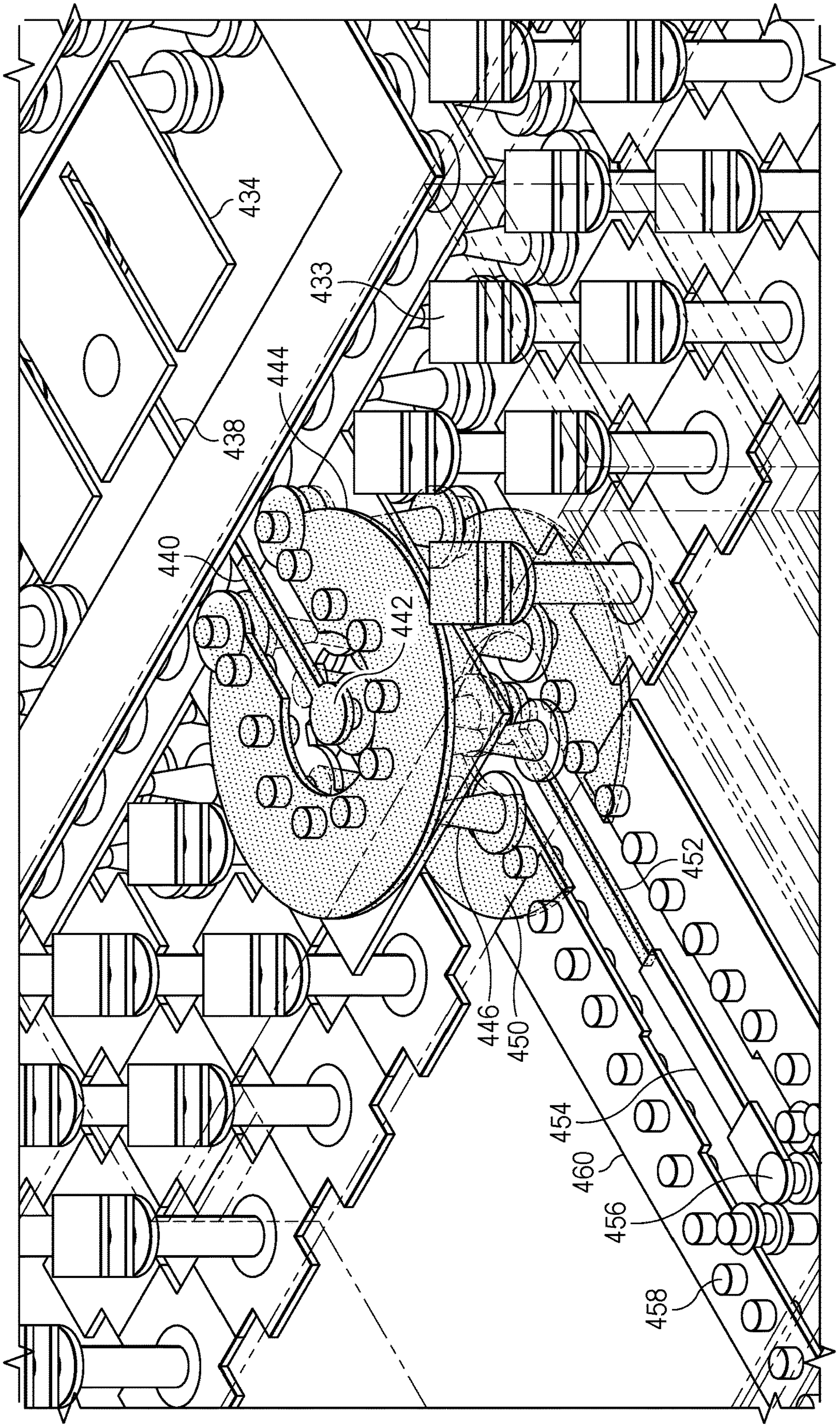
FIG. 6E is a perspective view of a mmWave quantum sensor device substrate including a via coupling multiple striplines in different substrate layers, in accordance with various examples.
Figure 6F:
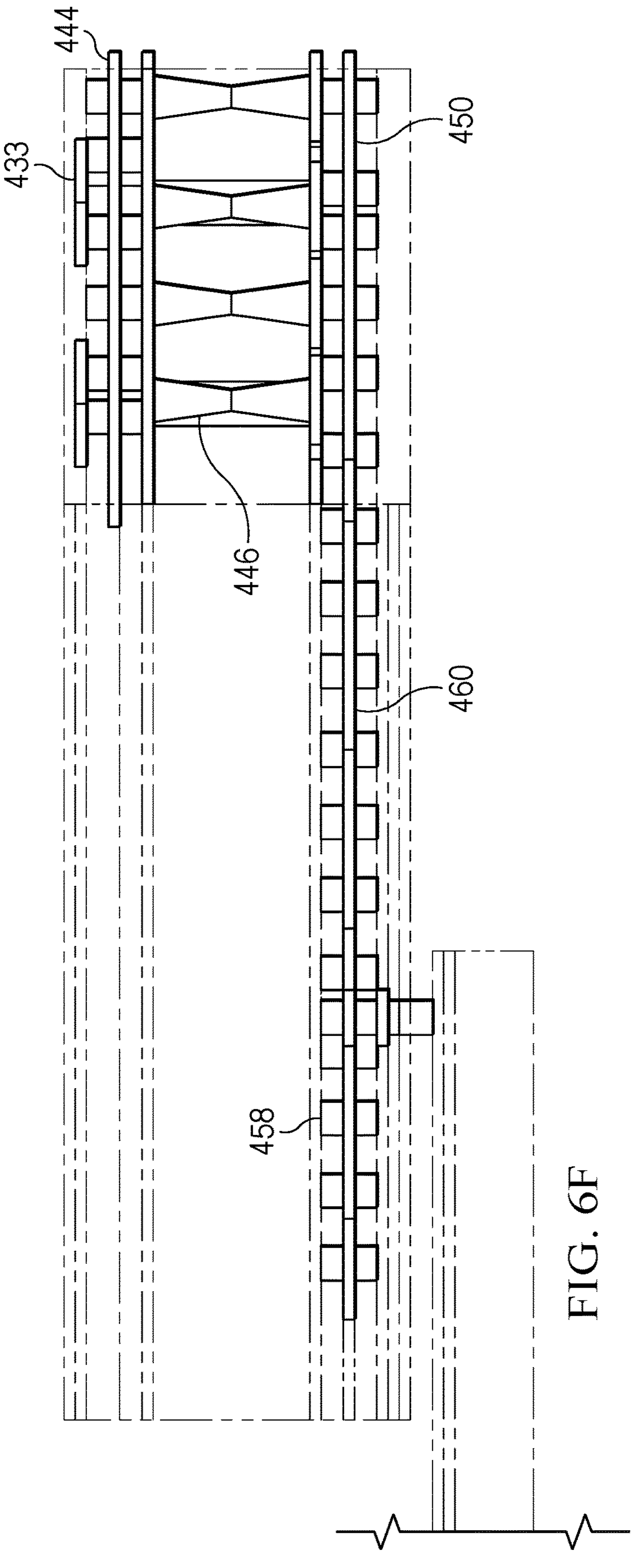
FIG. 6F is a profile view of a mmWave quantum sensor device substrate including a via coupling multiple striplines in different substrate layers, in accordance with various examples.
Figure 6G:
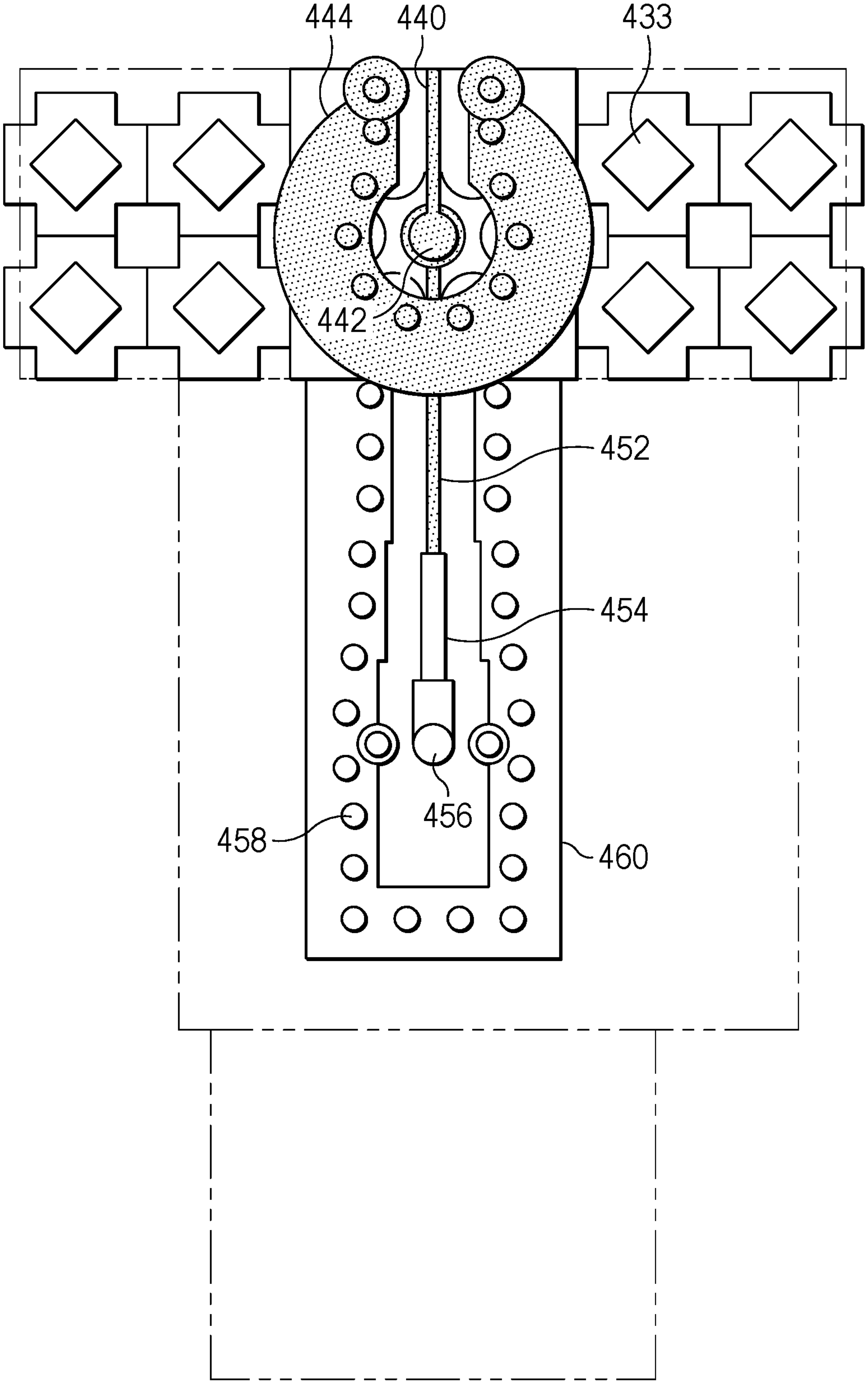
FIG. 6G is a top-down view of a mmWave quantum sensor device substrate including a via coupling multiple striplines in different substrate layers, in accordance with various examples.

FIG. 6E is a close-up perspective view of the stripline 452, via 442, ground planes 450 and 444, and stripline 440, in accordance with various examples. FIG. 6F is a close-up profile view of the structures of FIG. 6E, in accordance with various examples. FIG. 6G is a close-up top-down view of the structures of FIG. 6E, in accordance with various examples.

Figure 6H:
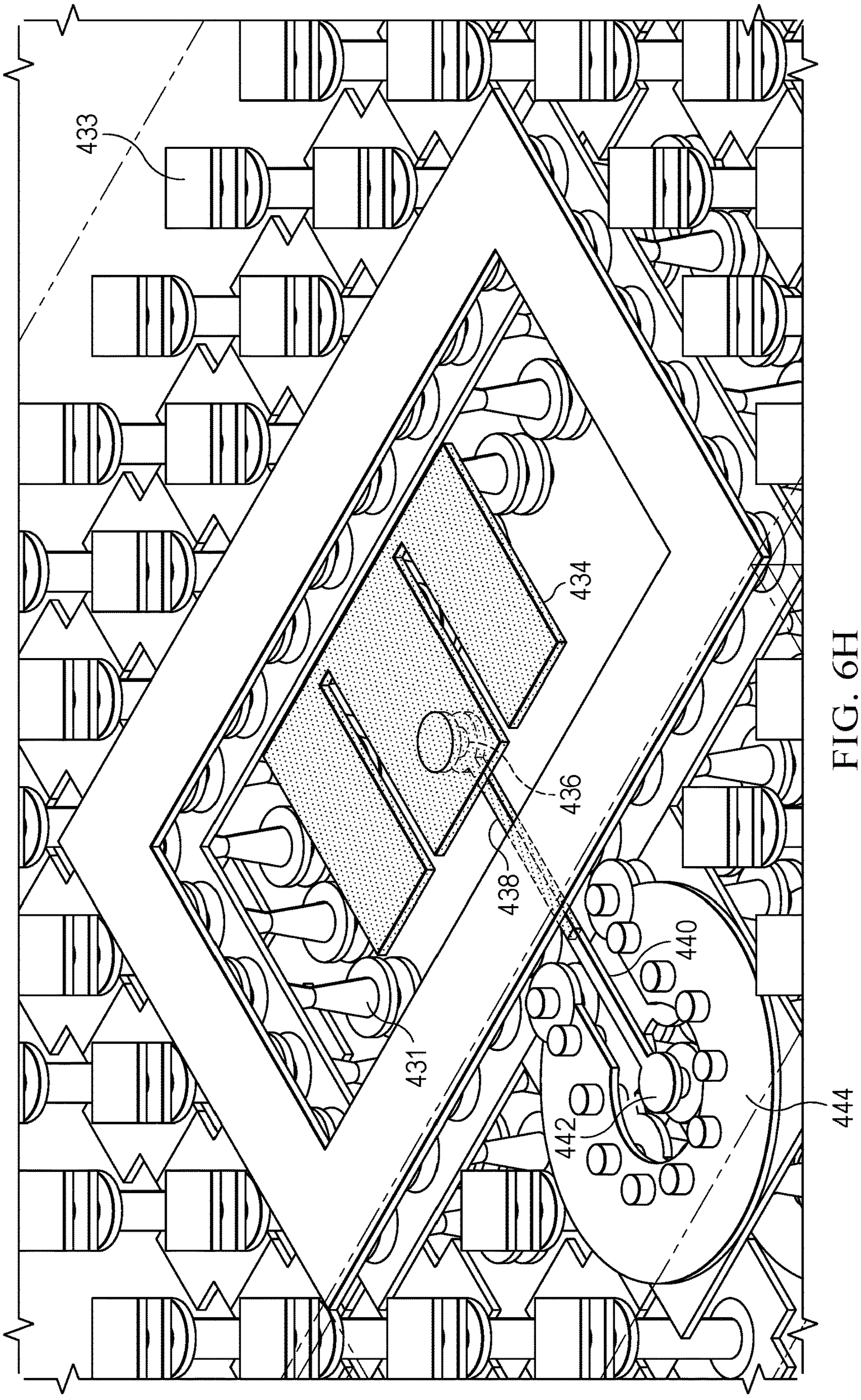
FIG. 6H is a perspective view of a mmWave quantum sensor device substrate including a receiver patch antenna coupled to a stripline, in accordance with various examples.
Figure 6I:
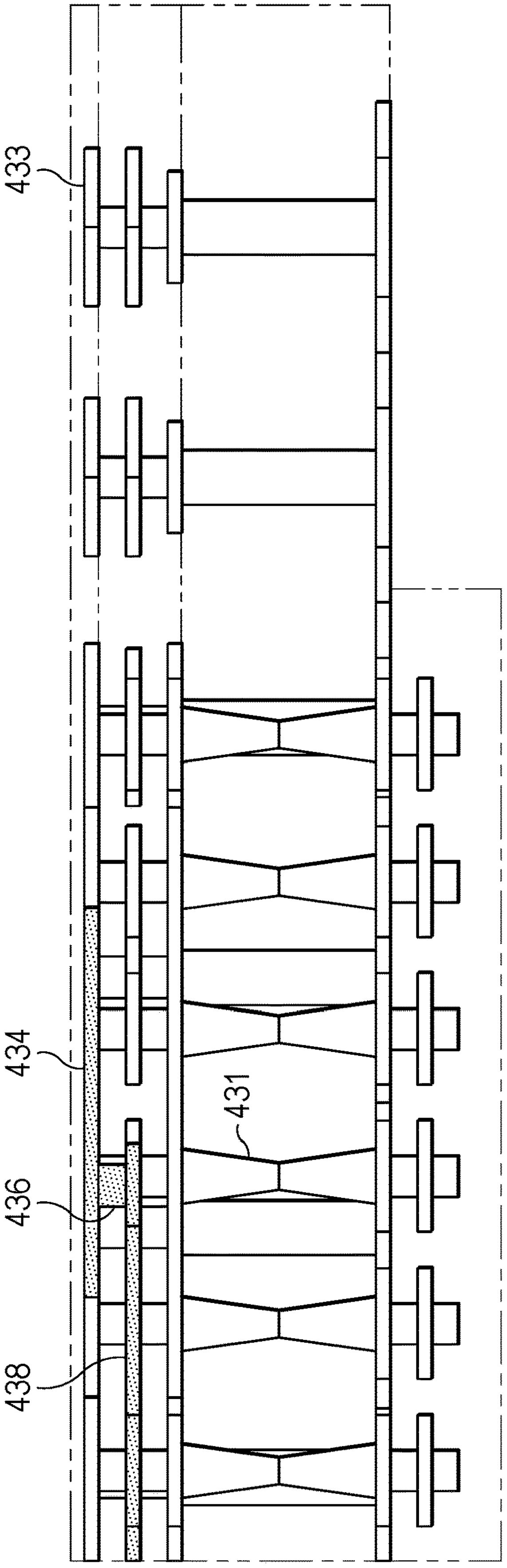
FIG. 6I is a profile view of a mmWave quantum sensor device substrate including a receiver patch antenna coupled to a stripline, in accordance with various examples.
Figure 6J:
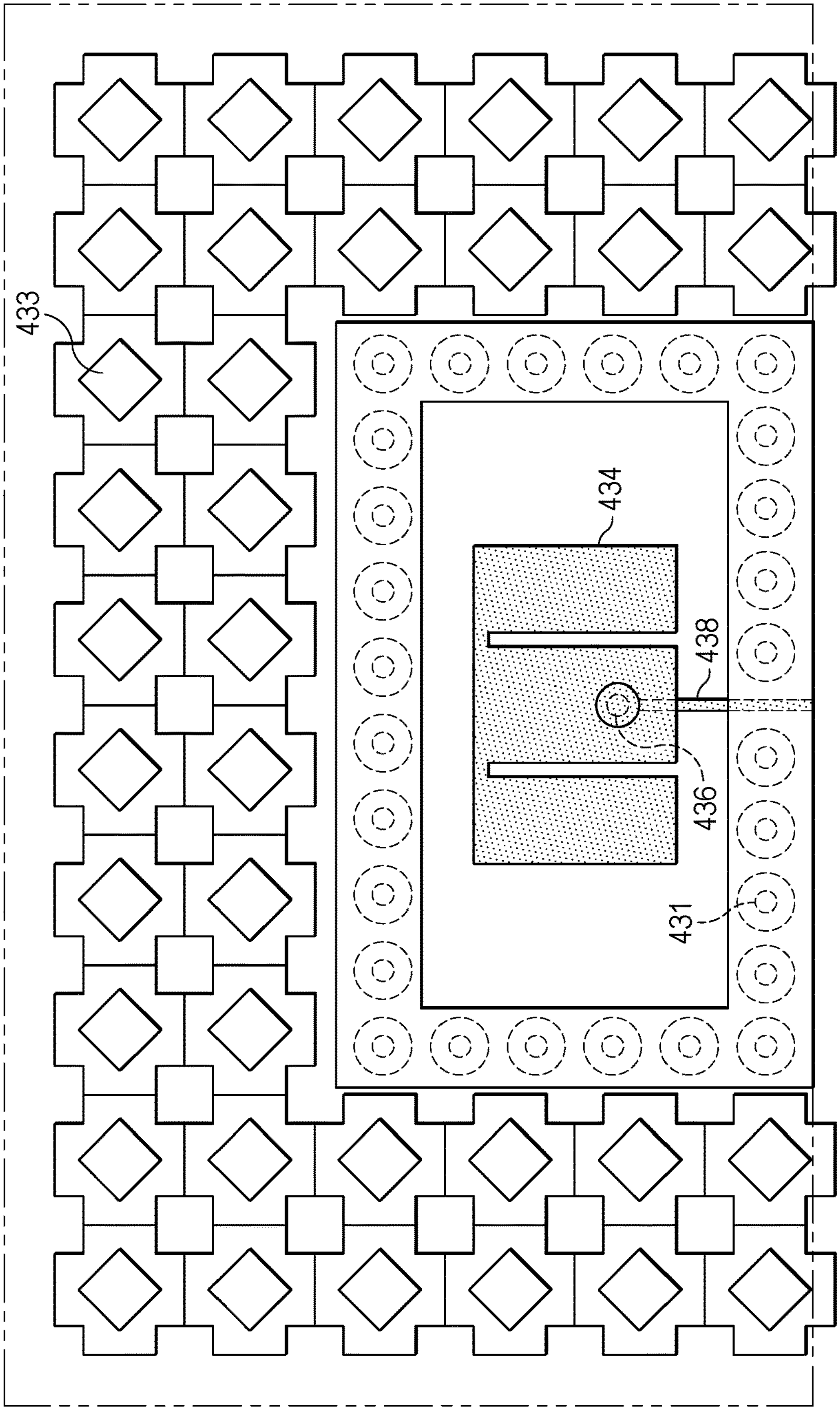
FIG. 6J is a top-down view of a mmWave quantum sensor device substrate including a receiver patch antenna coupled to a stripline, in accordance with various examples.
Figure 6K:
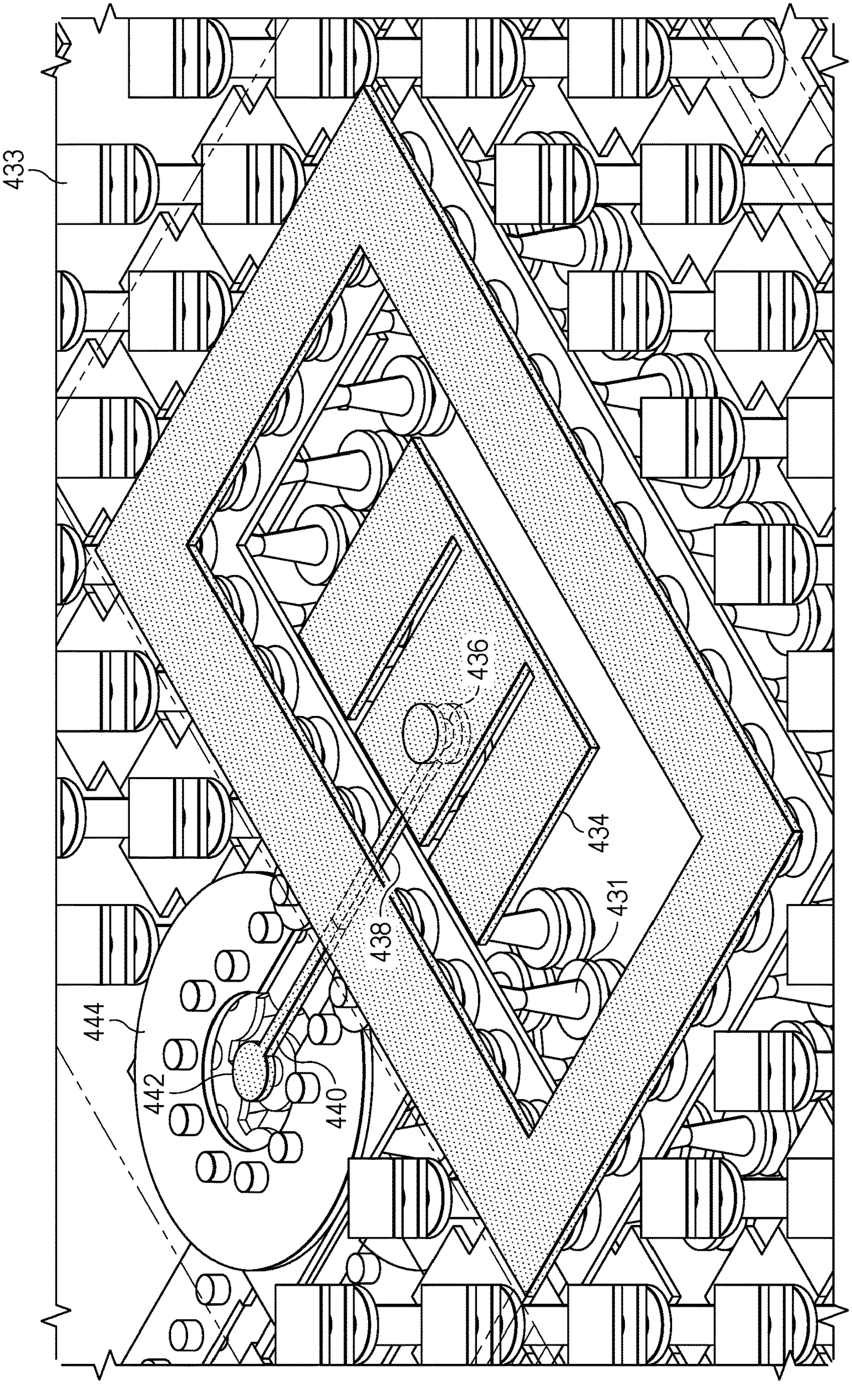
FIG. 6K is another perspective view of a mmWave quantum sensor device substrate including a receiver patch antenna coupled to a stripline, in accordance with various examples.

FIG. 6H is a close-up perspective view of the stripline 438, receive antenna 434, and the grounded pillars 431, in accordance with various examples. FIG. 6I is a close-up profile view of the structures of FIG. 6H, in accordance with various examples. FIG. 6J is a close-up top-down view of the structures of FIG. 6H, in accordance with various examples. FIG. 6K is a close-up perspective view of the structures of FIG. 6H, in accordance with various examples.

Referring to FIGS. 2A-6H, in operation, the transmit die 400 generates a differential signal to interrogate the quantum properties of the quantum gas stored in the U-shaped cell. The transmit die 400 provides the differential signal to the balun 408, which converts the differential signal to a single-ended signal. The balun 408 provides the signal to the transmit antenna 428 by way of the output line 410, the stripline 412, the via 416, the striplines 422, 424, and the via 426. The transmit antenna 428 receives the signal and radiates energy into the waveguide 214. The energy propagates through the waveguide 214 and into the glass tubes 208 through the inlet 213. The energy propagates through the glass tubes 208 along the length of the elongate member 204, away from the substrate 218. The energy enters the opposing glass tubes 208 and propagates through the glass tubes 208 along the length of the elongate member 204, toward the substrate 218. The energy exits the glass tubes 208 through the outlet 215 and enters the waveguide 216. The energy propagates through the waveguide 216 and reaches the receive antenna 434. The receive antenna 434 forms a receive signal that is provided to the receive die 462 by way of the via 436, the striplines 438, 440, the via 442, the striplines 452, 454, and the via 456. The receive die 462 is configured to receive the signal and determine a strength of the received signal. The receive die 462 may use the strength of the received signal as described below.

As described above, the energy propagates through the U-shaped cell both away from and toward the substrate 218. The U-shaped cell contains a quantum gas. As the energy propagates through the U-shaped cell, the energy generally does not disturb the rotational state of the quantum gas molecules. Consequently, the received signal energy as measured at the receive die 462 remains constant. However, at a precise frequency (e.g., 121.624 GHz), the energy is absorbed by the quantum gas molecules and many of these molecules transition from a quantum state J=9 (angular momentum quantum number) to J=10 which is an excited state. This quantum absorption results in diminished energy of the signal received at the receive die 462. Thus, it can be concluded that whenever the energy of the signal received at the receive die 462 is at the diminished level, the frequency of the signal must be the precise frequency mentioned above (e.g., 121.624 GHZ). Alteration of the signal frequency even slightly above 121.624 GHz or even slightly below 121.624 GHz will cause the energy of the signal received at the receive die 462 to rise. Typically, these quantum transitions have only a few MHz of width, but this quality factor depends on the pressure of the gas used. Thus, when the energy of the signal received at the receive die 462 is steady at the lower level, it can be concluded that the frequency of the signal is locked in at 121.624 GHz. Moreover, the energy of the signal received at the receive die 462 may be useful as feedback to constantly adjust the frequency of the signal as needed to maintain a precise frequency of 121.624 GHz (or other desired target frequency).

Figure 7A:
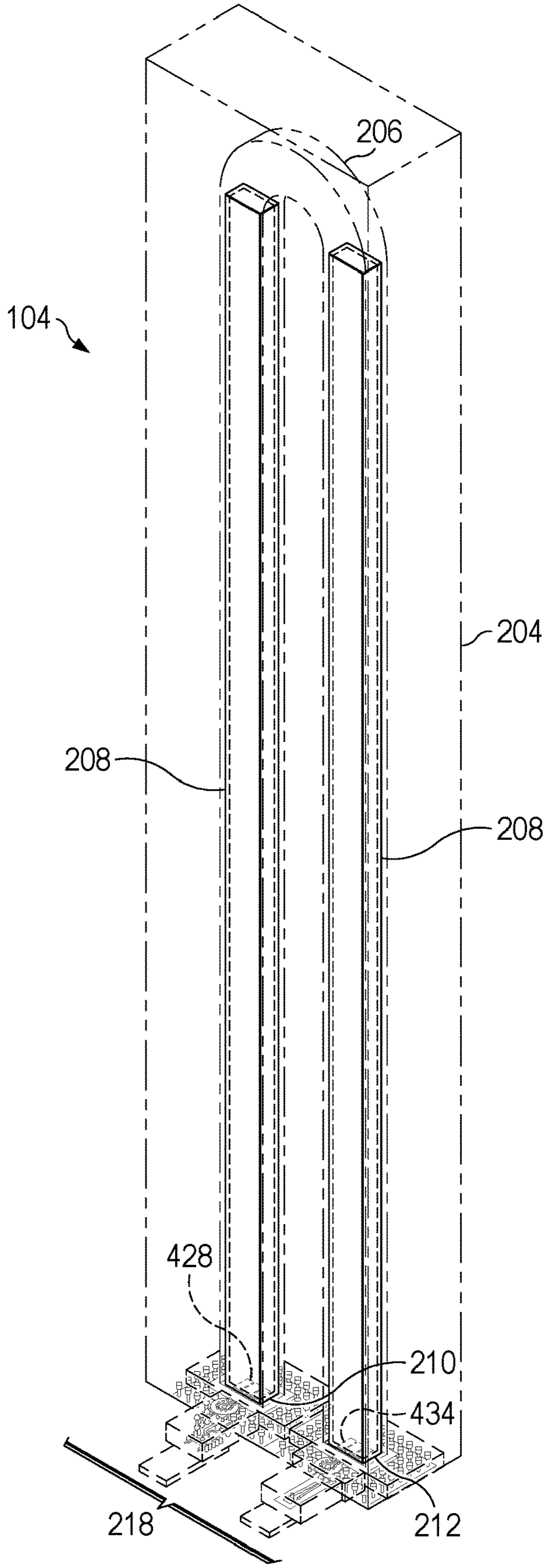
FIG. 7A is a perspective view of a mmWave quantum sensor device having a vertical launch, in accordance with various examples.
Figure 7B:
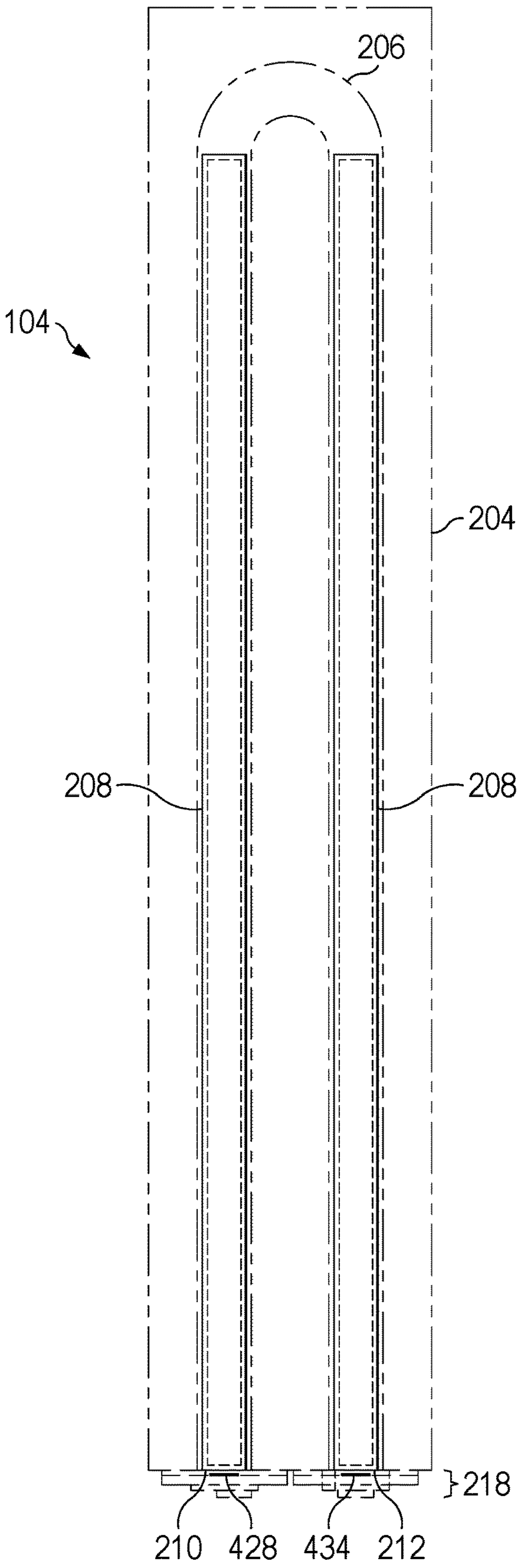
FIG. 7B is a frontal view of a mmWave quantum sensor device having a vertical launch, in accordance with various examples.
Figure 7C:
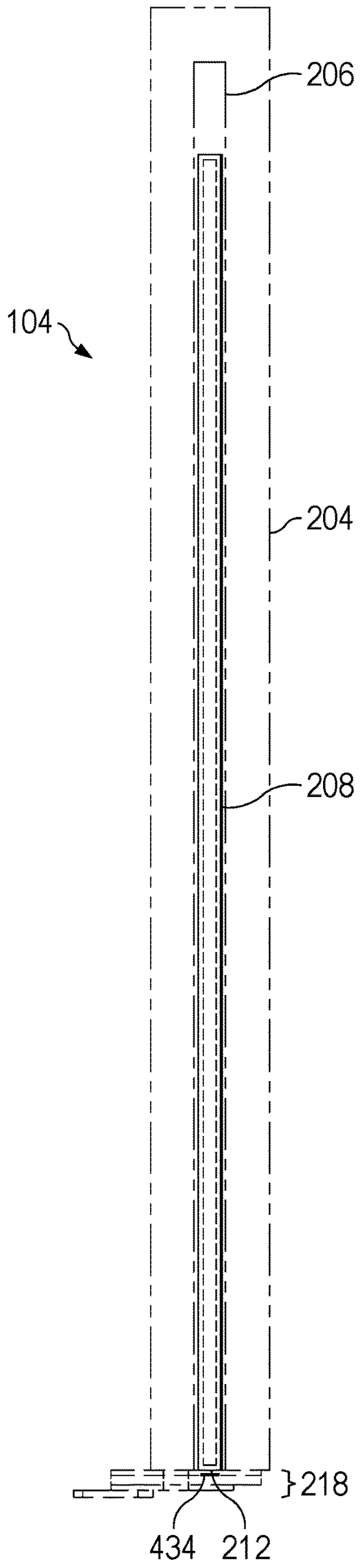
FIG. 7C is a profile view of a mmWave quantum sensor device having a vertical launch, in accordance with various examples
Figure 7E:
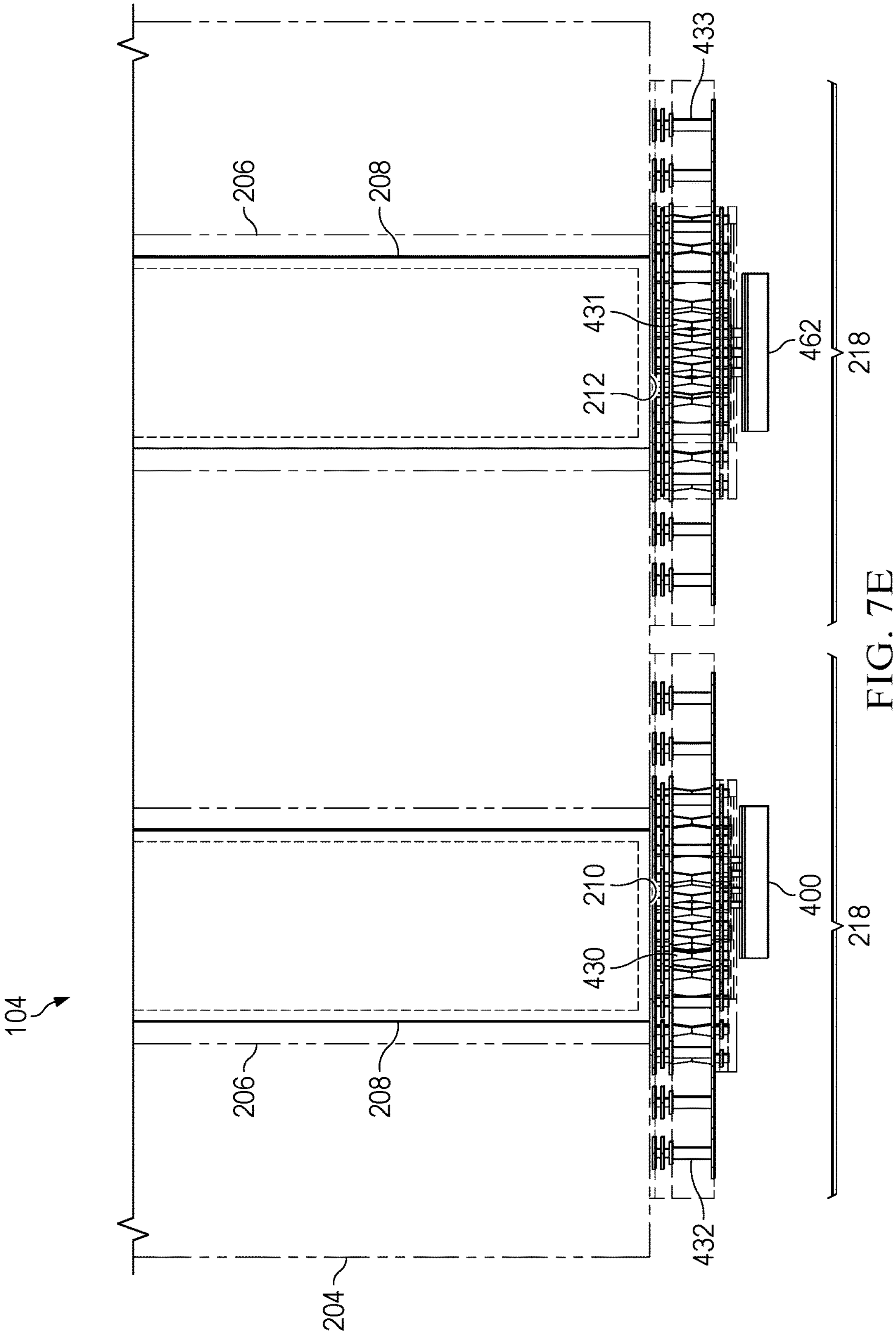
FIG. 7E is a frontal view of a mmWave quantum sensor device having a vertical launch and a substrate thereof, in accordance with various examples.

In some examples, such as depicted in FIG. 2A, the U-shaped cell (i.e., the cavity 206 and glass tubes 208) is oriented horizontally. In other examples, the U-shaped cell is oriented vertically. FIG. 7A is a perspective view of an example device 104 in which the U-shaped cell is oriented vertically, approximately orthogonal to the horizontal plane in which the substrate 218 lies. The device 104 of FIG. 7A is structurally identical to the device 104 of FIG. 2A, except that the vertical waveguides 214 and 216 are removed, thereby facilitating a direct coupling of the glass tubes 208 to the substrate 218. In particular, the ends 210, 212 are coupled directly to the substrate 218 in such a manner that the transmit and receive antennas 428, 434 are positioned within the glass tubes 208. FIG. 7B is a frontal view of the structure of FIG. 7A, in accordance with various examples. FIG. 7C is a profile view of the structure of FIG. 7A, in accordance with various examples. FIGS. 7D1-7D2 are close-up perspective views of structures depicted in FIG. 7A, in accordance with various examples. FIG. 7E is a close-up frontal view of the structures depicted in FIG. 7A, in accordance with various examples. The operation of the device 104 of FIGS. 7A-7E is similar to that of the device 104 of FIG. 2A, and thus is not repeated here.

Figure 8A:
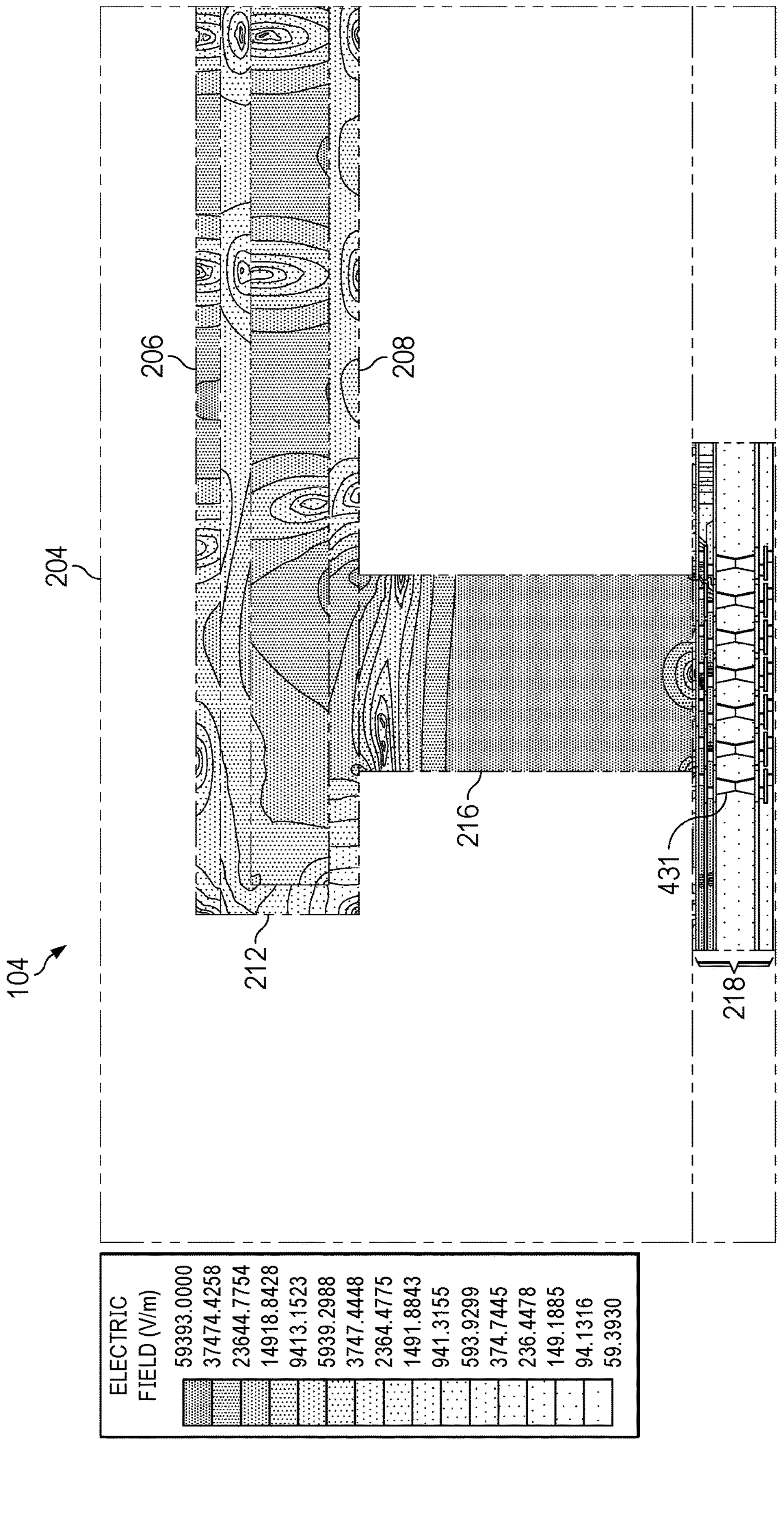
FIG. 8A is a profile view of a mmWave quantum sensor device with electromagnetic field behavior superimposed thereon, in accordance with various examples.
Figure 8B:
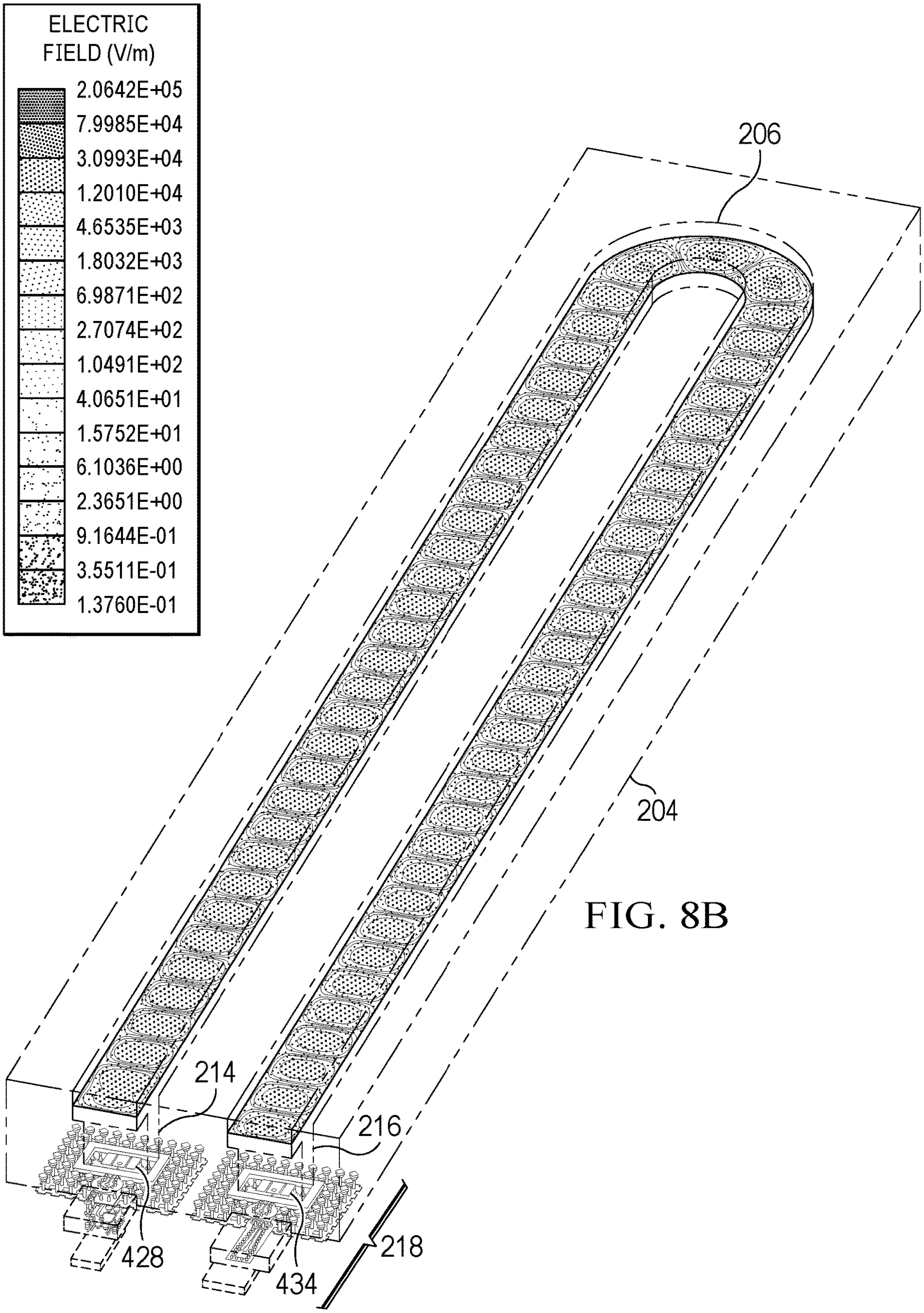
FIG. 8B is a profile view of a mmWave quantum sensor device with electromagnetic field behavior superimposed thereon, in accordance with various examples.
Figure 8C:
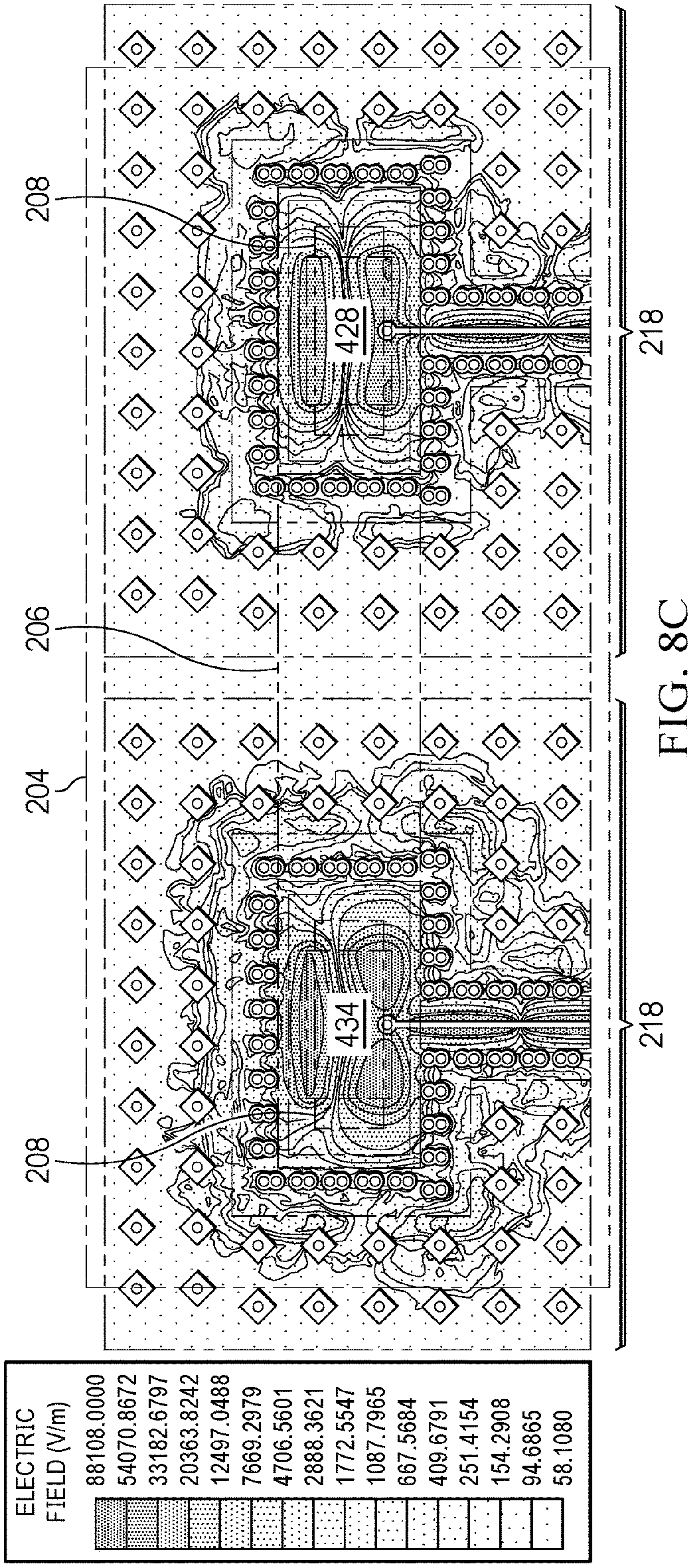
FIG. 8C is a bottom-up view of mmWave quantum sensor device transmitter and receiver patch antennas with electromagnetic field behavior superimposed thereon, in accordance with various examples.

FIG. 8A is a profile view of a device 104 with electromagnetic field behavior superimposed thereon, in accordance with various examples. As shown, the architecture of the substrate 218 is effective to contain the electromagnetic fields within desired areas. For example, the various ground planes within the substrate 218 depicted and described herein contain the electromagnetic fields and prevent cross-talk and EMI and maintain signal integrity. FIG. 8B is a profile view of a device 104 with electromagnetic field behavior superimposed thereon, in accordance with various examples. Specifically, FIG. 8B depicts the electromagnetic field behavior within the U-shaped cell as energy propagates through the cell. FIG. 8C is a bottom-up view of the transmit and receive antennas 428, 434 with electromagnetic field behavior superimposed thereon, in accordance with various examples. As shown, the grounded pillars 418, 430, 431 and the EBG structures 432, 433 are effective to contain the electromagnetic fields and to prevent cross-talk and EMI and to maintain signal integrity.

Figure 9:
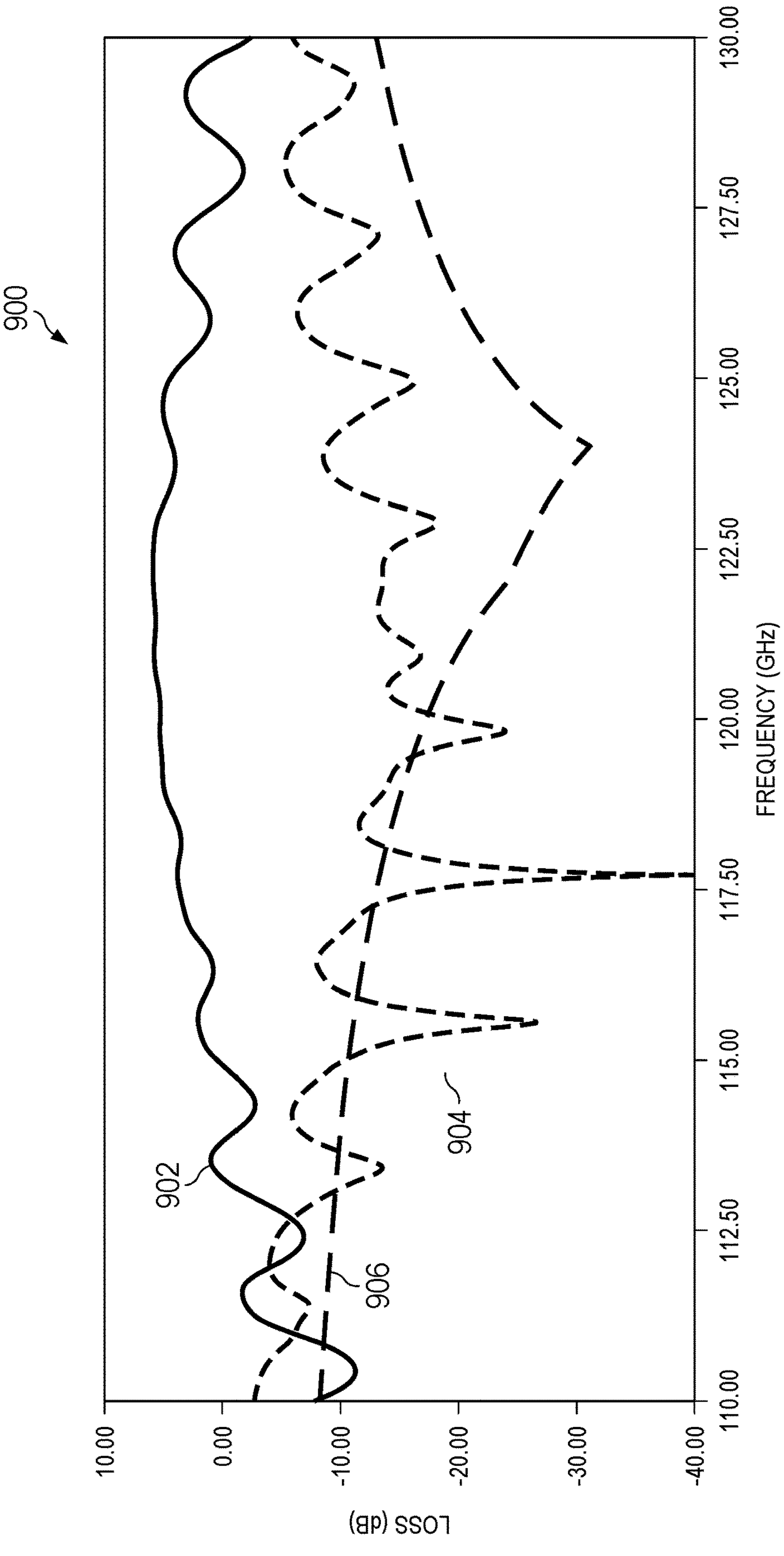
FIGS. 9-12 are graphs depicting scattering parameter activity for mmWave quantum sensor devices, in accordance with various examples.

FIGS. 9-12 are graphs depicting scattering parameter activity for mm Wave quantum sensor devices, in accordance with various examples. In particular, FIG. 9 is a graph 900 depicting insertion loss (curve 902), return loss at the receiver die 462 (curve 904), and return loss at the transmitter die 400 (curve 906). The x-axis indicates signal frequency in GHz, and the y-axis indicates loss in decibels (dB). As the curves 902, 904, and 906 show, for the horizontal launch variation (e.g., FIGS. 4A1-4A2), the return loss at the transmitter and receiver dies are below-10 dB in a 12 GHz band around the frequency of operation which indicates that the reflected electromagnetic energy is very small, and which is evidence of a well-matched signal path. The insertion loss of S12 is-10.2 dB at the frequency of operation (taking into account that the gain of the transmitter die is approximately 16.8 dB), which is the total loss in the signal path.

Figure 10:
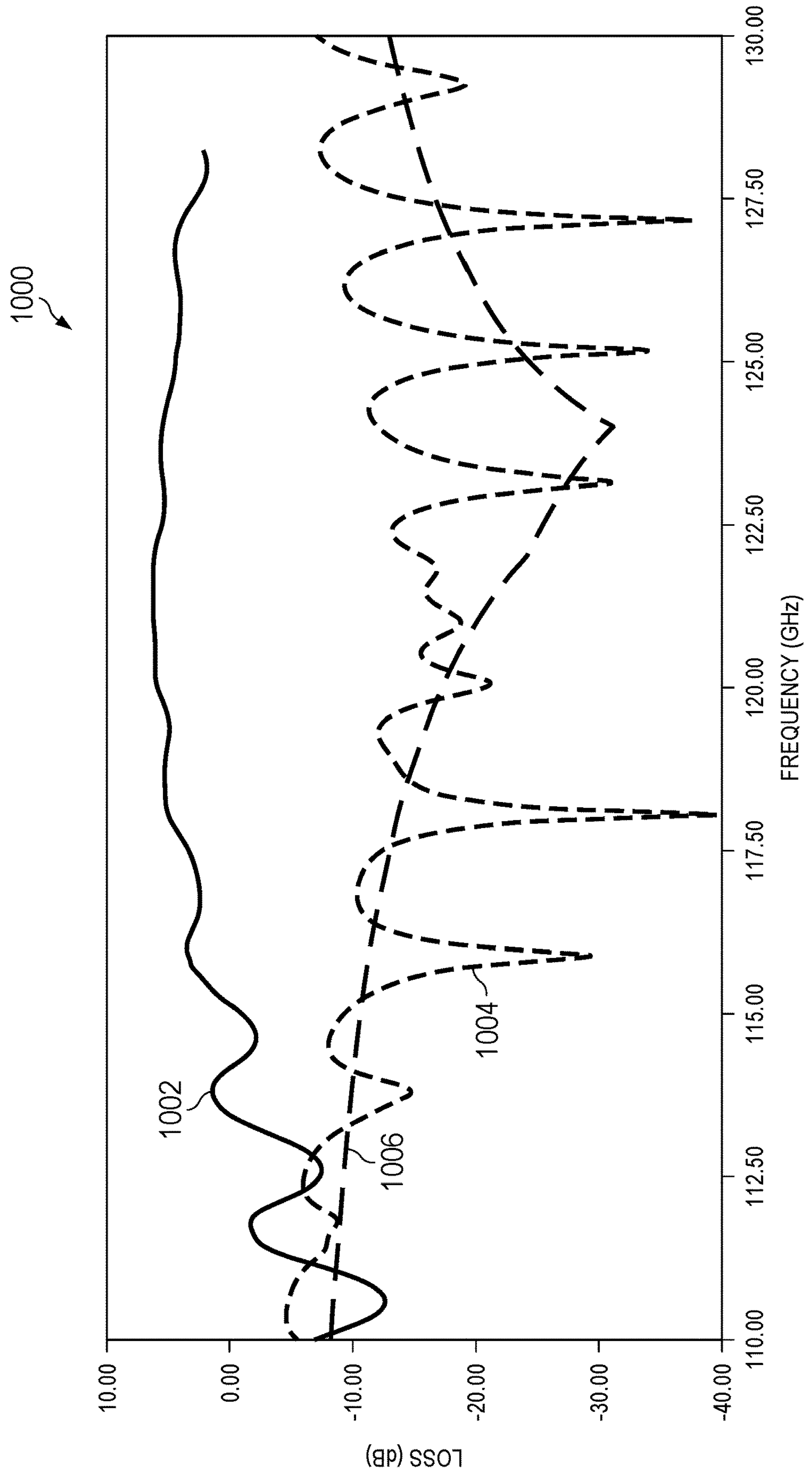

FIG. 10 is a graph 1000 depicting insertion loss (curve 1002), return loss at the receiver die 462 (curve 1004), and return loss at the transmitter die 400 (curve 1006). The x-axis indicates signal frequency in GHz, and the y-axis indicates loss in decibels (dB). As the curves 1002, 1004, and 1006 show, for the vertical launch variation (e.g., FIGS. 7D1-7D2), the return loss at the transmitter and receiver dies are below −10 dB in a 12 GHz band around the frequency of operation, which indicates that the reflected electromagnetic energy is very small, and which is evidence of a well-matched signal path. The insertion loss of S12 is −10.2 dB at the frequency of operation (taking into account that the gain of the transmitter die is 16.8 dB), which is the total loss in the signal path.

Figure 11:
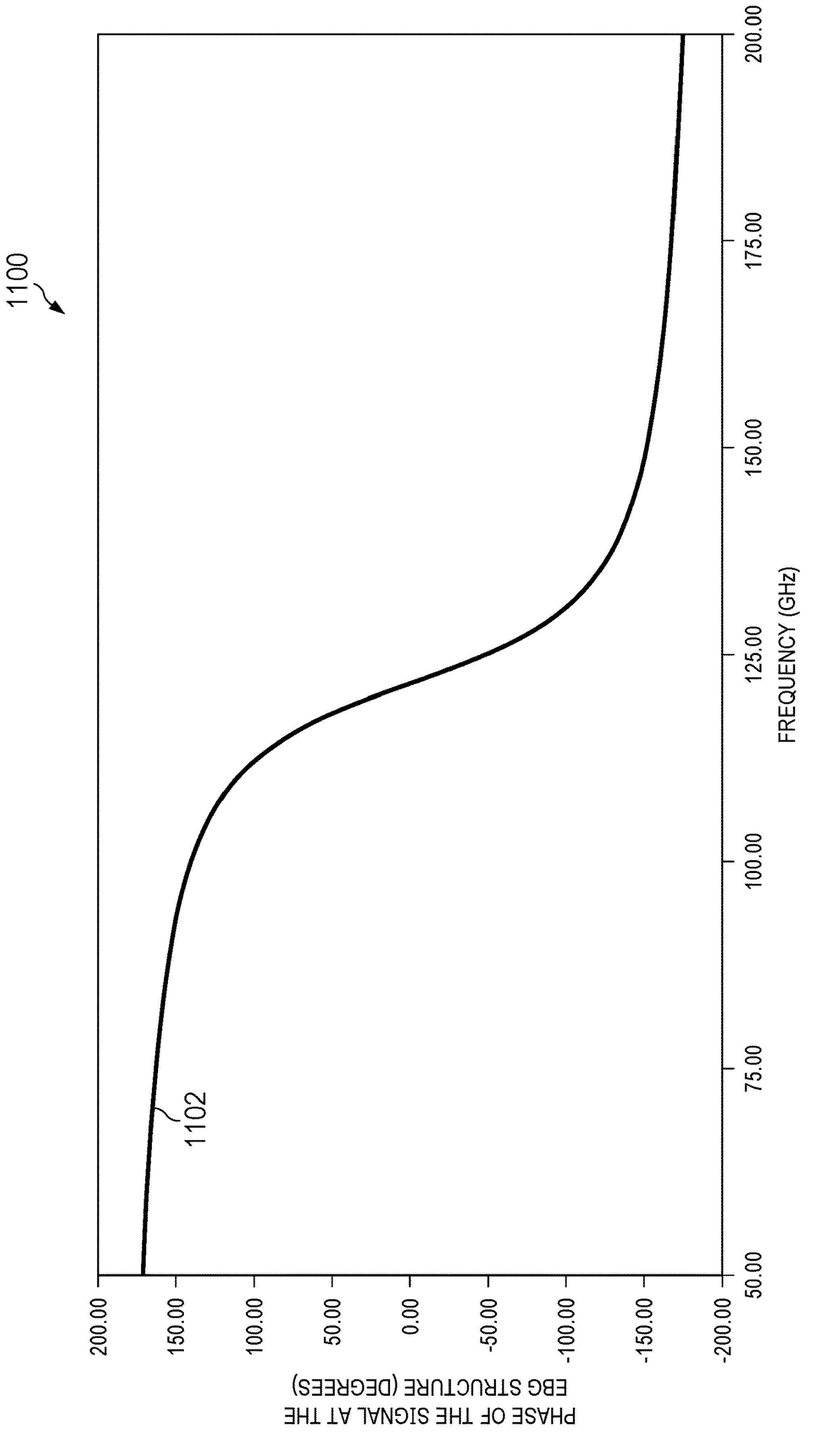

FIG. 11 is a graph 1100 depicting the change of phase of the electromagnetic signal as it finds the EBG structure (curve 1102). The x-axis indicates signal frequency in GHz, and the y-axis indicates the phase of the signal at the EBG structure in degrees. As the curve 1102 shows, the change of the phase from 180 degrees (below 121.624 GHZ) to −180 degrees (above 121.624 GHz) is an indication of the RLC resonance described above. This is a condition for an optimal high impedance surface at the frequency of operation.

Figure 12:
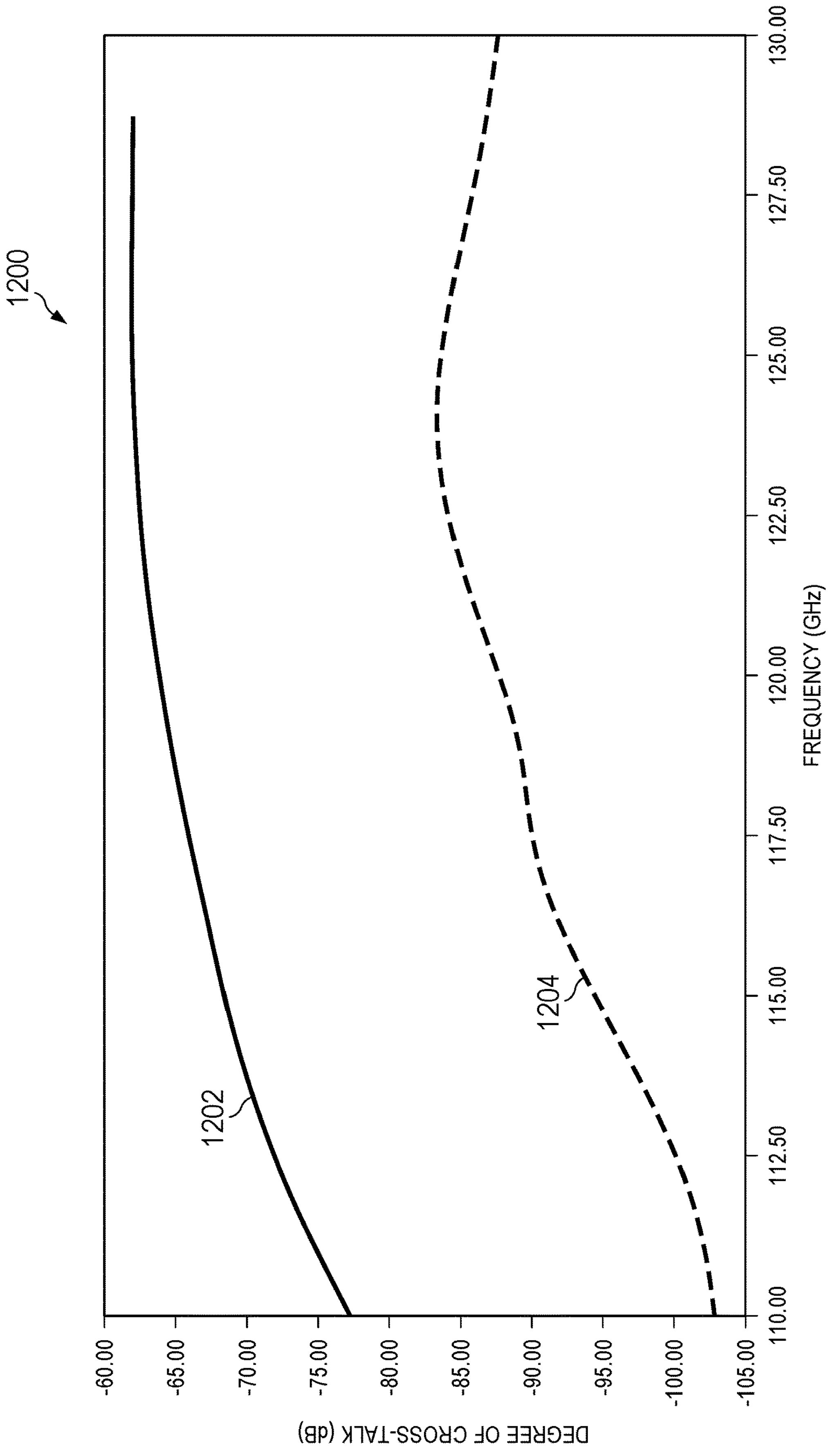

FIG. 12 is a graph 1200 depicting the degree of cross-talk between the transmit and receive antennas 428, 434 across a range of frequencies. The x-axis indicates signal frequency in GHz, and the y-axis indicates the degree of cross-talk in dB. As the shift from curve 1202 (the degree of cross-talk in the device 104 without the inclusion of EBG structures 432, 433) to curve 1204 (the degree of cross-talk in the device 104 with the inclusion of EBG structures 432, 433) shows, the EBG structures 432, 433 are effective in mitigating cross-talk between the transmit and receive antennas 428, 434.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

Uses of the term "ground" and variations thereof in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. A device, comprising:
- a U-shaped cell configured to contain a quantum gas;
- a first waveguide coupled to an inlet of the U-shaped cell;
- a second waveguide coupled to an outlet of the U-shaped cell;
- a multi-layer substrate including transmitter and receiver antennas that are aligned with the first and second waveguides, respectively, the multi-layer substrate including a network of metal layers coupled to the transmitter and receiver antennas; and
- transmitter and receiver dies coupled to the transmitter and receiver antennas, respectively, by way of the network of metal layers, the multi-layer substrate positioned between the U-shaped cell and the transmitter and receiver dies.

2. The device of claim 1, wherein the transmitter and receiver dies have device sides in which circuitry is formed, and wherein the device sides face the multi-layer substrate.

3. The device of claim 1, further comprising a balun coupled to the transmitter die.

4. The device of claim 3, further comprising a first stripline coupled to the balun and a via coupled to the first stripline.

5. The device of claim 4, wherein the via is surrounded by multiple grounded metal members.

6. The device of claim 4, further comprising a second stripline coupled to the via and to the transmitter antenna.

7. The device of claim 6, wherein the second stripline and the transmitter antenna are in different layers of the multi-layer substrate.

8. The device of claim 3, further comprising multiple ground planes, and wherein the balun is between the multiple ground planes.

9. The device of claim 1, further comprising a third stripline coupled to the receiver antenna, the third stripline and the receiver antenna in different layers of the multi-layer substrate.

10. The device of claim 9, further comprising a via coupled to the third stripline and a fourth stripline coupled to the via.

11. The device of claim 10, wherein the via is surrounded by multiple grounded metal members.

12. The device of claim 10, wherein the fourth stripline is coupled to the receiver die.

13. The device of claim 12, wherein the fourth stripline is surrounded by multiple grounded metal members.

14. The device of claim 1, wherein the transmitter and receiver antennas are patch antennas.

15. A device, comprising:
- a U-shaped cell configured to contain a quantum gas;
- a first waveguide coupled to an inlet of the U-shaped cell, the first waveguide oriented orthogonally to a plane in which a length of the U-shaped cell lies;
- a second waveguide coupled to an outlet of the U-shaped cell, the second waveguide oriented orthogonally to the plane in which the length of the U-shaped cell lies;
- a multi-layer substrate comprising:
  - a balun having a differential input and a single output;
  - a first stripline coupled to the single output of the balun;
  - a first via extending vertically from the first stripline to a second stripline, the first via surrounded by multiple grounded vias;
  - a transmitter patch antenna coupled to the second stripline, the transmitter patch antenna positioned in a different layer of the multi-layer substrate than the second stripline, the transmitter patch antenna aligned with the first waveguide;
  - a receiver patch antenna coupled to a third stripline, the receiver patch antenna positioned in a different layer of the multi-layer substrate than the third stripline, the receiver patch antenna aligned with the second waveguide; and
  - a second via extending vertically from the third stripline to a fourth stripline, the second via surrounded by multiple additional grounded vias, the fourth stripline surrounded by multiple grounded metal members; and
- transmitter and receiver dies coupled to the differential input of the balun and the fourth stripline, respectively, the transmitter and receiver dies positioned on an opposite side of the multi-layer substrate than the U-shaped cell.

16. The device of claim 15, wherein the U-shaped cell has first and second ends, and wherein a distance between the first end and a midpoint of an opening of the first waveguide in a horizontal direction is an integer multiple of half a wavelength of a signal to be transmitted through the U-shaped cell.

17. The device of claim 15, wherein the first and second waveguides comprise gold-plated copper.

18. The device of claim 15, further comprising a third waveguide covering the U-shaped cell.

19. The device of claim 15, wherein the U-shaped cell comprises a glass tube having a wall thickness ranging between 90 microns and 150 microns.

20. A device, comprising:

a U-shaped cell configured to contain a quantum gas, the U-shaped cell having first and second ends;

a first vertically oriented waveguide coupled to an inlet of the U-shaped cell, a distance between the first end and a midpoint of an opening of the first vertically oriented waveguide in a horizontal direction being an integer multiple of half a wavelength of a signal to be transmitted through the U-shaped cell;

a second vertically oriented waveguide coupled to an outlet of the U-shaped cell, a distance between the second end and a midpoint of an opening of the second vertically oriented waveguide in the horizontal direction being an integer multiple of half the wavelength of the signal to be transmitted through the U-shaped cell;

a multi-layer substrate comprising:

transmitter and receiver patch antennas, each of the transmitter and receiver patch antennas surrounded by a plurality of electronic bandgap structures;

first and second striplines extending horizontally from the transmitter and receiver patch antennas;

vias extending vertically from the first and second striplines;

third and fourth striplines extending horizontally from the vias;

a balun coupled to the third stripline, and multiple grounded metal members surrounding the fourth stripline; and a ball grid array;

a transmitter die coupled to the balun and surrounded by the ball grid array, a device side of the transmitter die having circuitry formed therein and facing the multi-layer substrate; and a receiver die coupled to the fourth stripline and surrounded by the ball grid array, a device side of the receiver die having circuitry formed therein and facing the multi-layer substrate, the transmitter and receiver dies on an opposite side of the multi-layer substrate than the U-shaped cell.

21. The device of claim 20, wherein the first and second waveguides comprise gold-plated copper.

22. The device of claim 20, further comprising a third waveguide covering the U-shaped cell.

23. The device of claim 20, wherein the U-shaped cell comprises a glass tube having a wall thickness ranging between 90 microns and 150 microns.

* * * * *